(12) United States Patent
Wu et al.

(10) Patent No.: US 11,461,329 B2
(45) Date of Patent: *Oct. 4, 2022

(54) TRACKING QUERY EXECUTION STATUS FOR SELECTIVELY ROUTING QUERIES

(71) Applicant: Amazon Technologies, Inc., Seattle, WA (US)

(72) Inventors: Xing Wu, Redmond, WA (US); Bhargava Ram Kalathuru, Seattle, WA (US); Jian Fang, Sammamish, WA (US); Yuanyuan Yue, Bellevue, WA (US); Pratik Bhagwat Gawande, Seattle, WA (US); Turkay Mert Hocanin, New York, NY (US); Jason Douglas Denton, Seattle, WA (US); Luca Natali, Kenmore, WA (US); Rahul Sharma Pathak, Seattle, WA (US); Abhishek Rajnikant Sinha, Redmond, WA (US); Sumeetkumar Veniklal Maru, Redmond, WA (US); Armen Tangamyan, Bellevue, WA (US); Yufeng Jiang, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/006,522

(22) Filed: Aug. 28, 2020

(65) Prior Publication Data

US 2021/0049175 A1    Feb. 18, 2021

Related U.S. Application Data

(63) Continuation of application No. 15/470,841, filed on Mar. 27, 2017, now Pat. No. 10,762,086.

(Continued)

(51) Int. Cl.
*G06F 7/00* (2006.01)
*G06F 16/2453* (2019.01)
(Continued)

(52) U.S. Cl.
CPC .......... *G06F 16/24545* (2019.01); *G06F 9/50* (2013.01); *G06F 9/505* (2013.01);
(Continued)

(58) Field of Classification Search
CPC .......... G06F 16/24545; G06F 16/2471; G06F 16/27; G06F 16/24553; G06F 16/24549;
(Continued)

(56) References Cited

U.S. PATENT DOCUMENTS 6,859,926 B1    2/2005   Brenner et al.
7,243,093 B2 *  7/2007   Cragun .............. G06F 16/2471
(Continued)

FOREIGN PATENT DOCUMENTS

EP    2778967    9/2014

OTHER PUBLICATIONS

Anonymous, "optimization—Are SQL Execution Plans based on Schema or Data or both?", Stack Overflow.com, Retrieved from the Internet: URL:https://web.archive.org/web/20160708184640/https://stackoverflow.com/questions/4787205/are-sql-execution-plans-based-onschema-or-data-or-both, Jul. 8, 2016.

*Primary Examiner* — Mohammad A Sana
(74) *Attorney, Agent, or Firm* — Robert C. Kowert; Kowert, Hood, Munyon, Rankin & Goetzel, P.C.

(57) ABSTRACT

Query execution status may be tracked to selectively route queries to resources for execution. The completion of queries executing at computing resources obtained from a pool of computing resources configured to execute queries may be detected. Instead of returning the computing resources to the pool, the computing resources may be identified as (Continued)

available in resource management data. When another query is received, the resource management data may be evaluated to select an available computing resource. The query may then be routed to the selected computing resource for execution.

20 Claims, 15 Drawing Sheets

Related U.S. Application Data

(60) Provisional application No. 62/382,477, filed on Sep. 1, 2016.

(51) Int. Cl.

| | | |
|---|---|---|
| *G06F 16/21* | (2019.01) | |
| *G06F 16/248* | (2019.01) | |
| *G06F 16/28* | (2019.01) | |
| *G06F 16/2455* | (2019.01) | |
| *G06F 16/2458* | (2019.01) | |
| *G06F 16/903* | (2019.01) | |
| *G06F 9/50* | (2006.01) | |
| *G06F 16/27* | (2019.01) | |
| *G06F 16/20* | (2019.01) | |
| *G06F 16/25* | (2019.01) | |
| *H04L 67/1008* | (2022.01) | |
| *H04L 67/1029* | (2022.01) | |
| *H04L 67/10* | (2022.01) | |
| *H04L 67/1031* | (2022.01) | |
| *G06F 16/245* | (2019.01) | |

(52) U.S. Cl.
CPC .......... *G06F 9/5022* (2013.01); *G06F 9/5044* (2013.01); *G06F 9/5055* (2013.01); *G06F 9/5061* (2013.01); *G06F 9/5088* (2013.01); *G06F 16/20* (2019.01); *G06F 16/211* (2019.01); *G06F 16/248* (2019.01); *G06F 16/2455* (2019.01); *G06F 16/2471* (2019.01); *G06F 16/24549* (2019.01); *G06F 16/24553* (2019.01); *G06F 16/25* (2019.01); *G06F 16/27* (2019.01); *G06F 16/282* (2019.01); *G06F 16/90335* (2019.01); *H04L 67/10* (2013.01); *H04L 67/1008* (2013.01); *H04L 67/1029* (2013.01); *H04L 67/1031* (2013.01); *G06F 9/5027* (2013.01); *G06F 16/245* (2019.01); *G06F 2209/501* (2013.01); *G06F 2209/503* (2013.01); *G06F 2209/508* (2013.01); *G06F 2209/5011* (2013.01)

(58) Field of Classification Search
CPC ...... G06F 16/2455; G06F 16/25; G06F 16/20; G06F 16/248; G06F 16/282; G06F 16/211; G06F 9/50; G06F 9/5022; G06F 9/5044; G06F 9/505; G06F 9/5061; G06F 9/5088

See application file for complete search history.

(56) References Cited

U.S. PATENT DOCUMENTS

| | | |
|---|---|---|
| 8,429,096 B1 | 4/2013 | Soundararajan et al. |
| 8,429,097 B1 | 4/2013 | Sivasubramanian et al. |
| 9,208,032 B1 | 12/2015 | McAlister et al. |
| 10,762,086 B2 * | 9/2020 | Wu ................... H04L 29/08261 |
| 2004/0205759 A1 | 10/2004 | Oka |
| 2008/0201459 A1 | 8/2008 | Vul et al. |
| 2010/0094891 A1 | 4/2010 | Noyes et al. |
| 2012/0179644 A1 | 7/2012 | Miranker |
| 2013/0024442 A1 * | 1/2013 | Santosuosso ......... G06F 16/245 707/720 |
| 2013/0262638 A1 | 10/2013 | Kumarasamy |
| 2014/0074540 A1 | 3/2014 | Evans et al. |
| 2014/0156632 A1 | 6/2014 | Yu et al. |
| 2014/0229221 A1 | 8/2014 | Shih et al. |
| 2014/0280076 A1 | 9/2014 | Sumizawa |
| 2015/0040180 A1 | 2/2015 | Jacobson et al. |
| 2015/0149501 A1 * | 5/2015 | Prakash ................ G06F 9/5027 707/769 |
| 2015/0234682 A1 | 8/2015 | Dageville et al. |
| 2016/0373478 A1 | 12/2016 | Doubleday |
| 2018/0039674 A1 * | 2/2018 | Seyvet ............. G06F 16/24535 |

* cited by examiner

TRACKING QUERY EXECUTION STATUS FOR SELECTIVELY ROUTING QUERIES

RELATED APPLICATIONS

This application is a continuation of U.S. patent application Ser. No. 15/470,841, filed Mar. 27, 2017, which claims benefit of priority to U.S. Provisional Application Ser. No. 62/382,477, filed Sep. 1, 2016, and which are incorporated herein by reference in their entirety.

BACKGROUND

Computing systems for querying of large sets of data can be extremely difficult to implement and maintain. In many scenarios, for example, it is necessary to first create and configure the infrastructure (e.g. server computers, storage devices, networking devices, etc.) to be used for the querying operations. It might then be necessary to perform extract, transform, and load ("ETL") operations to obtain data from a source system and place the data in data storage. It can also be complex and time consuming to install, configure, and maintain the database management system ("DBMS") that performs the query operations. Moreover, many DBMS are not suitable for querying extremely large data sets in a performant manner.

Computing clusters can be utilized in some scenarios to query large data sets in a performant manner. For instance, a computing cluster can have many nodes that each execute a distributed query framework for performing distributed querying of a large data set. Such computing clusters and distributed query frameworks are, however, also difficult to implement, configure, and maintain. Moreover, incorrect configuration and/or use of computing clusters such as these can result in the non-optimal utilization of processor, storage, network and, potentially, other types of computing resources.

The disclosure made herein is presented with respect to these and other considerations.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Figure 1:
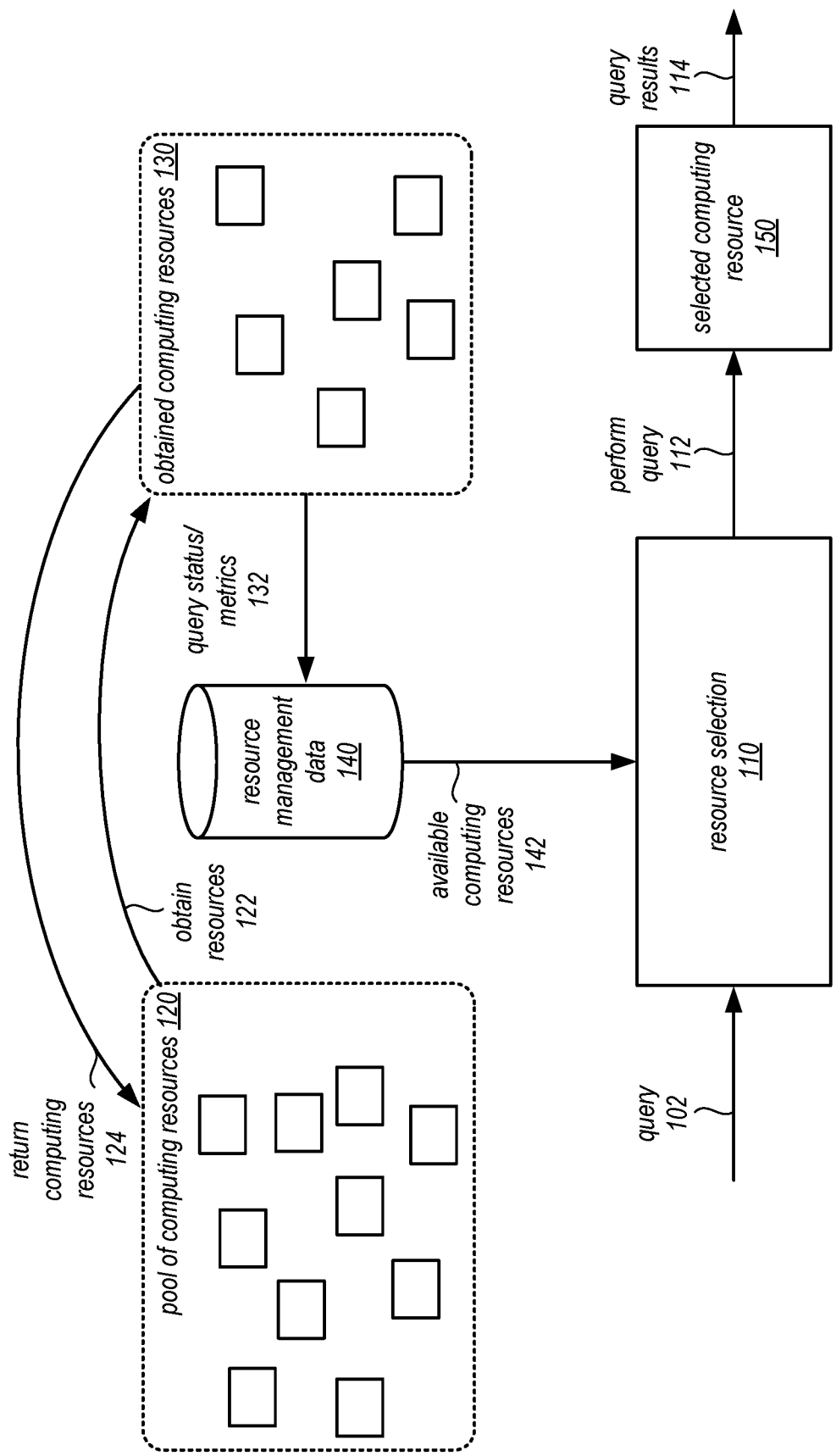
FIG. 1 illustrates a logical block diagram of tracking query execution status for selectively routing queries, according to some embodiments.

Various embodiments of tracking query execution status for selectively routing queries are described herein. FIG. 1 illustrates a logical block diagram of tracking query execution status for selectively routing queries, according to some embodiments. Configured computing resources 120 may be instantiated, configured, and otherwise prepared for executing different types of queries, such as query 102, in some embodiments. For example, configured computing resources may be one or more nodes, instances, hosts, or other collections of computing resources (e.g., a cluster of computing resources) that implement a query engine (e.g., a distributed query processing engine or framework) for executing queries with respect to data sets (e.g., that may be remotely stored), in one embodiment. Computing resources 120 may be differently configured, in at least some embodiments, providing opportunities to offer different execution performance for queries.

As illustrated in FIG. 1, computing resources may be obtained 122 to execute queries, in various embodiments. Obtained computing resources 130 may be computing resources that are currently executing or will execute queries 102. Resource management data 140 may track and/or store query status and other metrics 132 obtained from computing resources 130. When a query completes execution of a query the computing resource may be retained to execute another query (as discussed below with regard to FIGS. 10-11, or returned 124 to pool of computing resources 124 (as discussed below with regard to FIG. 12). For example, the completion of a queries execution may be detected, and resource management data 140 may be updated to indicate that the resource is available to service another query, instead of returning the computing resource to pool of computing resources, in some embodiments. Resource selection 110 may select an available computing resource 142 that was retained (e.g., not returned to pool of computing resources), in various embodiments. In this way, resource selection 110 may direct queries to already configured computing resources without having to obtain a new resource from pool of computing resources 120 or perform costly operations to return 124 computing resources (e.g., as a results of performing a scrubbing operation, as discussed below) to pool of computing resources 120.

In some embodiments, available computing resources 142 may be selected based on the configuration of the resource (e.g., optimal or capable of executing query 102) or based on the submitter of the query (e.g., user identifier, network address, account, etc.). In this way, computing resources may be reused to service queries in which the reuse would be efficient (e.g., optimal configuration or same user so no scrubbing may have to be performed), in various embodiments. The selected computing resource 150 may then be instructed to perform 112 the query and provide query results 114.

Please note that the previous description of tracking query execution status for selectively routing queries is a logical illustration and thus is not to be construed as limiting as to the implementation of a network-based service, pool of computing resources, pool of computing resources, or pool management for job execution resources.

This specification begins with a general description of a provider network that implements a managed query service that implements tracking query execution status to selectively route queries. Then various examples of the managed query service and resource management service (along with other services that may be utilized or implemented) including different components/modules, or arrangements of components/module that may be employed as part of implementing the services are discussed. A number of different methods and techniques to implement tracking query execution status for selectively routing queries are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
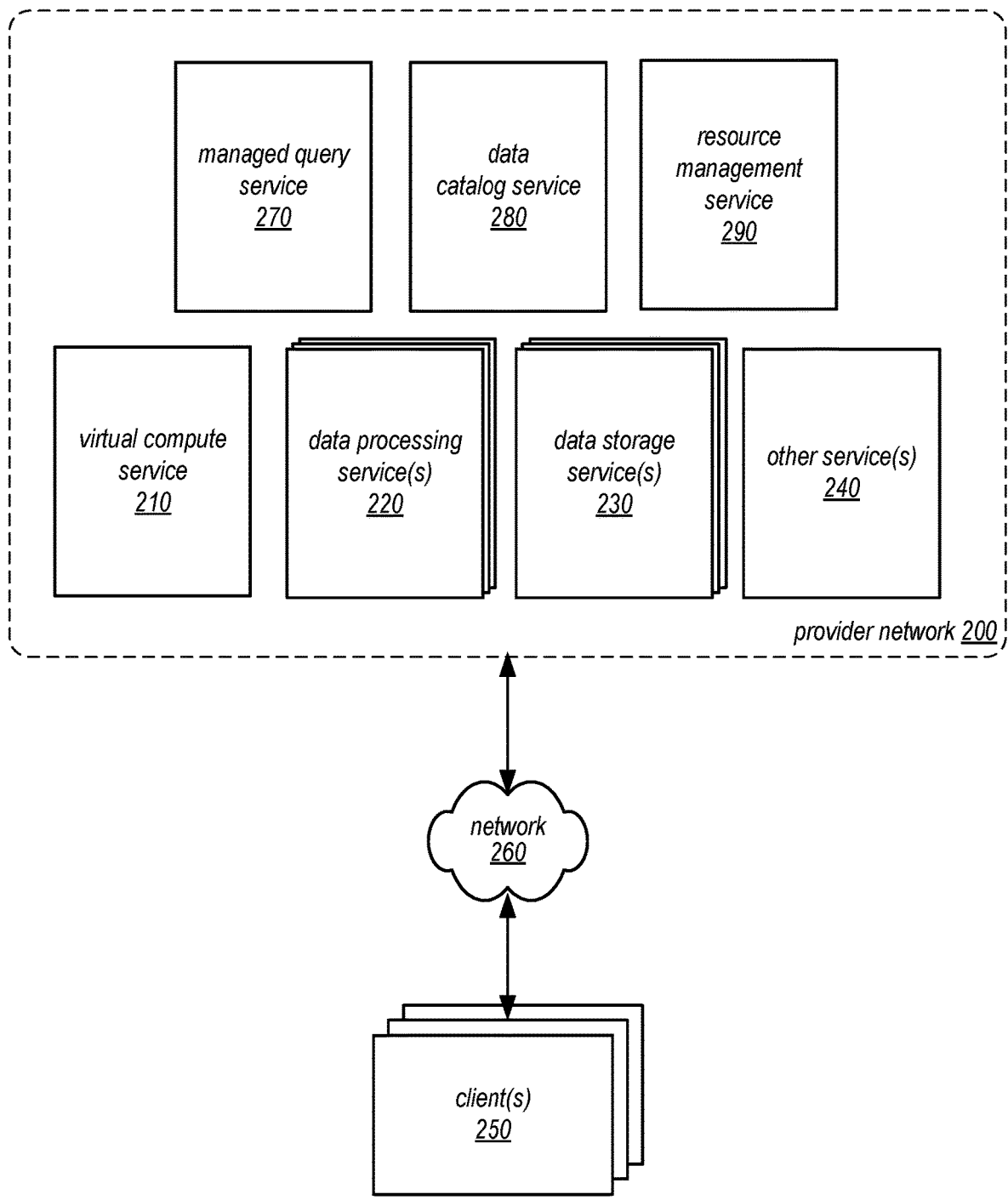
FIG. 2 is a logical block diagram illustrating a provider network implementing a managed query service, according to some embodiments.

FIG. 2 is a logical block diagram illustrating a provider network implementing a managed query service, according to some embodiments. Provider network 200 may be a private or closed system or may be set up by an entity such as a company or a public sector organization to provide one or more services (such as various types of cloud-based storage) accessible via the Internet and/or other networks to clients 250, in some embodiments. Provider network 200 may be implemented in a single location or may include numerous data centers hosting various resource pools, such as collections of physical and/or virtualized computer servers, storage devices, networking equipment and the like (e.g., FIGS. 13, 14 and computing system 2000 described below with regard to FIG. 15), needed to implement and distribute the infrastructure and storage services offered by the provider network 200. In some embodiments, provider network 200 may implement various computing resources or services, such as a virtual compute service 210, data processing service(s) 220, (e.g., relational or non-relational (NoSQL) database query engines, map reduce processing, data flow processing, and/or other large scale data processing techniques), data storage service(s) 230, (e.g., an object storage service, block-based storage service, or data storage service that may store different types of data for centralized access) other services 240 (any other type of network based services (which may include various other types of storage, processing, analysis, communication, event handling, visualization, and security services not illustrated), managed query service 270, data catalog service 280, and resource management service 290.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 15 and described below. In various embodiments, the functionality of a given system or service component (e.g., a component of data storage service 230) may be implemented by a particular node or may be distributed across several nodes. In some embodiments, a given node may implement the functionality of more than one service system component (e.g., more than one data store component).

Virtual compute service 210 may be implemented by provider network 200, in some embodiments. Virtual computing service 210 may offer instances and according to various configurations for client(s) 250 operation. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances and of provider network 200 in different embodiments, including general purpose or special purpose computer servers, storage devices, network devices and the like. In some embodiments instance client(s) 250 or other any other user may be configured (and/or authorized) to direct network traffic to a compute instance.

Compute instances may operate or implement a variety of different platforms, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client(s) 202 applications, without for example requiring the client(s) 250 to access an instance. Applications (or other software operated/implemented by a compute instance and may be specified by client(s), such as custom and/or off-the-shelf software.

In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length. Different configurations of compute instances, as discussed below with regard to FIG. 3, may be implemented as computing resources associated in different pools of resources managed by resource management service 290 for executing jobs routed to the resources, such as queries routed to select resources by managed query service 270.

Data processing services 220 may be various types of data processing services to perform different functions (e.g., query or other processing engines to perform functions such as anomaly detection, machine learning, data lookup, or any other type of data processing operation). For example, in at least some embodiments, data processing services 230 may include a map reduce service that creates clusters of processing nodes that implement map reduce functionality over data stored in one of data storage services 240. Various other distributed processing architectures and techniques may be implemented by data processing services 230 (e.g., grid computing, sharding, distributed hashing, etc.). Note that in some embodiments, data processing operations may be implemented as part of data storage service(s) 230 (e.g., query engines processing requests for specified data). Data processing service(s) 230 may be clients of data catalog service 220 in order to obtain structural information for performing various processing operations with respect to data sets stored in data storage service(s) 230, as provisioned resources in a pool for managed query service 270.

Data catalog service 280 may provide a catalog service that ingests, locates, and identifies data and the schema of data stored on behalf of clients in provider network 200 in data storage services 230. For example, a data set stored in a non-relational format may be identified along with a container or group in an object-based data store that stores the data set along with other data objects on behalf of a same customer or client of provider network 200. In at least some embodiments, data catalog service 280 may direct the transformation of data ingested in one data format into another data format. For example, data may be ingested into data storage service 230 as single file or semi-structured set of data (e.g., JavaScript Object Notation (JSON)). Data catalog service 280 may identify the data format, structure, or any other schema information of the single file or semi-structured set of data. In at least some embodiments, the data stored in another data format may be converted to a different data format as part of a background operation (e.g., to discover the data type, column types, names, delimiters of fields, and/or any other information to construct the table of semi-structured data in order to create a structured version of the data set). Data catalog service 280 may then make the schema information for data available to other services, computing devices, or resources, such as computing resources or clusters configured to process queries with respect to the data, as discussed below with regard to FIGS. 3-7.

Data storage service(s) 230 may implement different types of data stores for storing, accessing, and managing data on behalf of clients 250 as a network-based service that enables clients 250 to operate a data storage system in a cloud or network computing environment. For example, data storage service(s) 230 may include various types of database storage services (both relational and non-relational) for storing, querying, and updating data. Such services may be enterprise-class database systems that are highly scalable and extensible. Queries may be directed to a database in data storage service(s) 230 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

One data storage service 230 may be implemented as a centralized data store so that other data storage services may access data stored in the centralized data store for processing and or storing within the other data storage services, in some embodiments. A may provide storage and access to various kinds of object or file data stores for putting, updating, and getting various types, sizes, or collections of data objects or files. Such data storage service(s) 230 may be accessed via programmatic interfaces (e.g., APIs) or graphical user interfaces. A centralized data store may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI).

In at least some embodiments, one of data storage service(s) 230 may be a data warehouse service that utilizes a centralized data store implemented as part of another data storage service 230. A data warehouse service as may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data. A client's use for the data may also affect the configuration of the data management system used to store the data. For instance, for certain types of data analysis and other operations, such as those that aggregate large sets of data from small numbers of columns within each row, a columnar database table may provide more efficient performance. In other words, column information from database tables may be stored into data blocks on disk, rather than storing entire rows of columns in each data block (as in traditional database schemes).

Managed query service 270, as discussed below in more detail with regard to FIGS. 3-7, may manage the execution of queries on behalf of clients so that clients may perform queries over data stored in one or multiple locations (e.g., in different data storage services, such as an object store and a database service) without configuring the resources to execute the queries, in various embodiments. Resource management service 290, as discussed in more detail below with regard to FIGS. 8-14, may manage and provide pools of computing resources for different services like managed query service 270 in order to execute jobs on behalf the different services, as discussed above with regard to FIG. 1.

Generally speaking, clients 250 may encompass any type of client configurable to submit network-based requests to provider network 200 via network 260, including requests for storage services (e.g., a request to create, read, write, obtain, or modify data in data storage service(s) 240, etc.) or managed query service 270 (e.g., a request to query data in a data set stored in data storage service(s) 230). For example, a given client 250 may include a suitable version of a web browser, or may include a plug-in module or other type of code module that may execute as an extension to or within an execution environment provided by a web browser. Alternatively, a client 250 may encompass an application such as a database application (or user interface thereof), a media application, an office application or any other application that may make use of storage resources in data storage service(s) 240 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application may interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. For example, client 250 may integrate with an operating system or file system to provide storage on one of data storage service(s) 240 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 240 may be coordinated by client 250 and the operating system or file system on behalf of applications executing within the operating system environment.

Clients 250 may convey network-based services requests (e.g., access requests directed to data in data storage service(s) 240, operations, tasks, or jobs, being performed as part of data processing service(s) 230, or to interact with data catalog service 220) to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Figure 3:
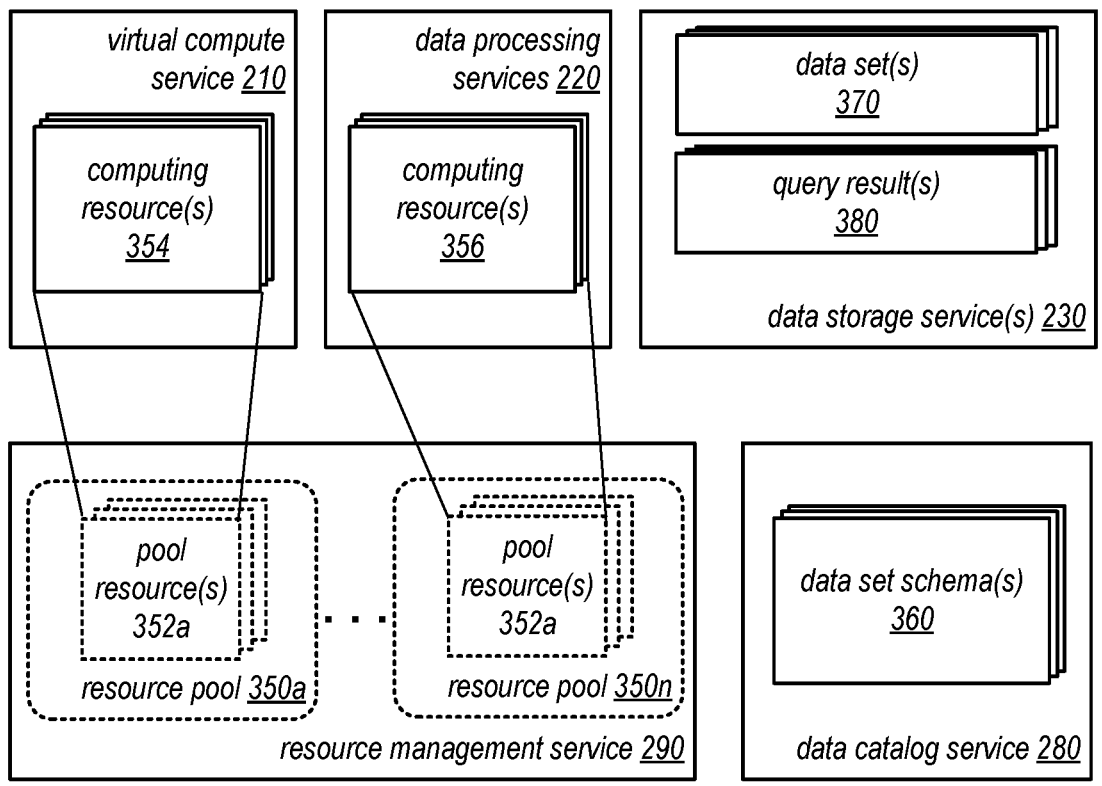
FIG. 3 is a logical block diagram illustrating a managed query service, according to some embodiments.
Figure 3:
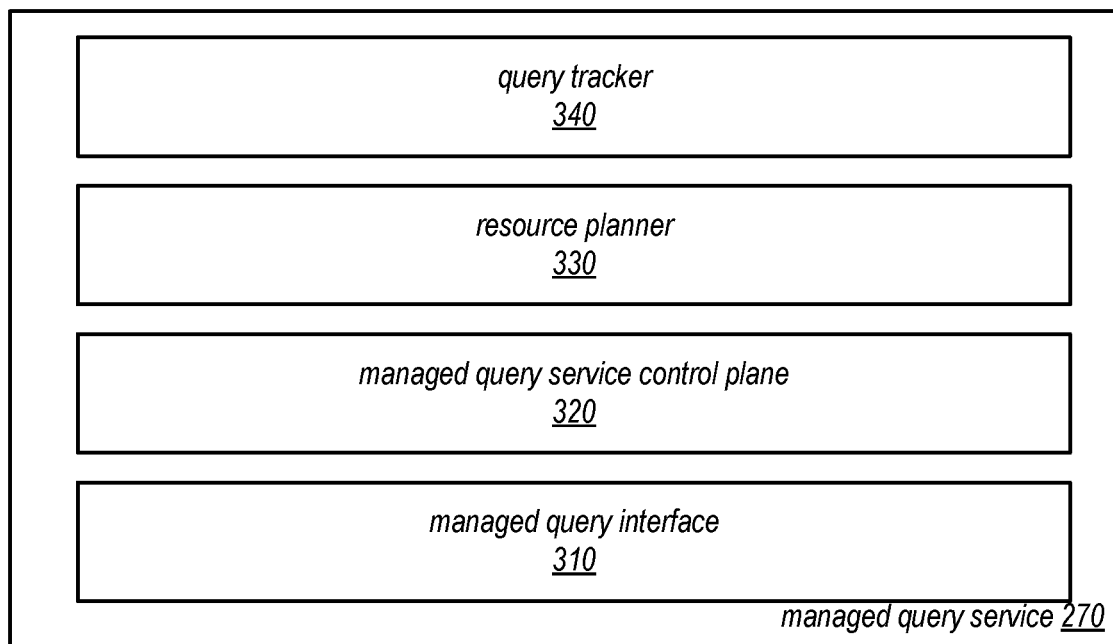

FIG. 3 is a logical block diagram illustrating a managed query service, according to some embodiments. As discussed below with regard to FIGS. 4-9, managed query service 270 may leverage the capabilities of various other services in provider network 200. For example, managed query service 270 may utilize resource management service 290 to provision and manage pools of preconfigured resources to execute queries, provide resources of preconfigured queries, and return utilized resources to availability. For example, resource management service 290 may instantiate, configure, and provide resource pool(s) 350a and 350n that include pool resource(s) 352a and 352n from one or more different resource services, such as computing resource(s) 354 in virtual compute service 210 and computing resource(s) 356 in data processing service(s) 220. Resource management service 290 may send requests to create, configure, tag (or otherwise associate) resources 352 for a particular resource pool, terminate, reboot, otherwise operate resources 352 in order to execute jobs on behalf of other network-based services.

Once a resource from a pool is provided (e.g., by receiving an identifier or other indicator of the resource to utilize), managed query service 270 may interact directly with the resource 354 in virtual compute service 210 or the resource 356 in data processing services 220 to execute queries, in various embodiments. Managed query service 270 may utilize data catalog service 280, in some embodiments to store data set schemas 352, as discussed below with regard to FIG. 4, for subsequent use when processing queries, as discussed below with regard to FIGS. 5-7, in some embodiments. For example, a data set schema may identify the field or column data types of a table as part of a table definition so that a query engine (executing on a computing resource), may be able to understand the data being queried, in some embodiments. Managed query service 270 may also interact with data storage service(s) 230 to directly source data sets 370 or retrieve query results 380, in some embodiments.

Figure 4:
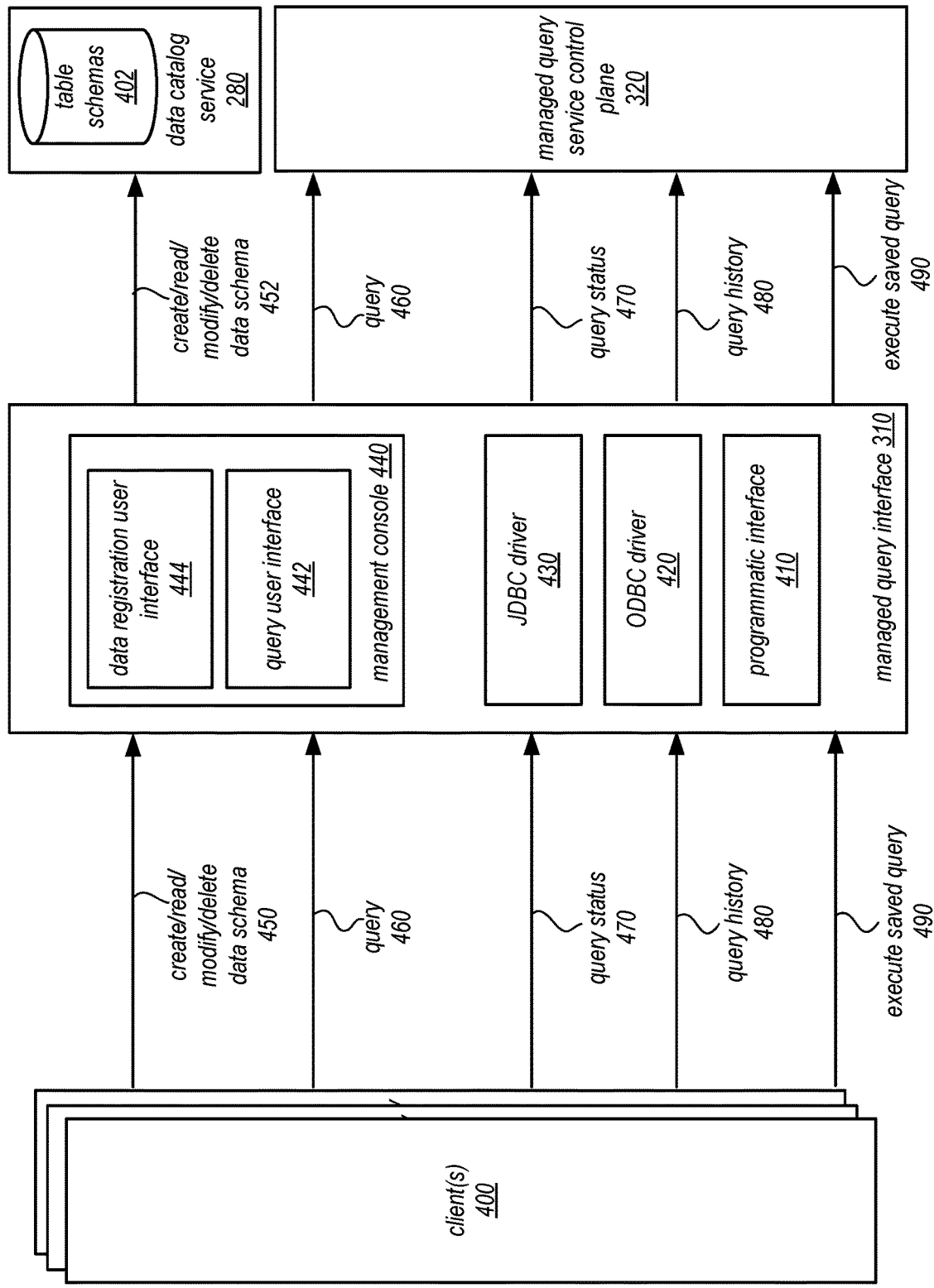
FIG. 4 is a diagram illustrating interactions between clients and managed query service, according to some embodiments.

Managed query service 270 may implement a managed query interface 310 to handle requests from different client interfaces, as discussed below with regard to FIG. 4. For example, different types of requests, such as requests formatted according to an Application Programmer Interface (API), standard query protocol or connection, or requests received via a hosted graphical user interface implemented as part of managed query service may be handled by managed query interface 310.

Managed query service 270 may implement managed query service control plane 320 to manage the operation of service resources (e.g., request dispatchers for managed query interface 310, resource planner workers for resource planner 330, or query tracker monitors for query tracker 340). Managed query service control plane 320 may direct requests to appropriate components as discussed below with regard to FIGS. 5 and 6. Managed query service 270 may implement authentication and authorization controls for handling requests received via managed query interface 310. For example, managed query service control plane 320 may validate the identity or authority of a client to access the data set identified in a query received from a client (e.g., by validating an access credential). In at least some embodiments, managed query service control plane 320 may maintain (in an internal data store or as part of a data set in an external data store, such as in one of data storage service(s) 230), query history, favorite queries, or query execution logs, and other managed query service historical data. Query execution costs may be billed, calculated or reported by managed query service control plane 320 to a billing service (not illustrated) or other system for reporting usage to users of managed query service, in some embodiments.

Managed query service 270 may implement resource planner 330 to intelligently select available computing resources from pools for execution of queries, in some embodiments. For example, resource planner 330 may evaluated collected data statistics associated with query execution (e.g., reported by computing resources) and determine an estimated number or configuration of computing resources for executing a query within some set of parameters (e.g., cost, time, etc.). For example, machine learning techniques may be applied by resource planner 330 to generate a query estimation model that can be applied to the features of a received query to determine the number/configuration of resources, in one embodiment. Resource planner 330 may then provide or identify which ones of the resources available to execute the query from a pool may best fit the estimated number/configuration, in one embodiment.

In various embodiments, managed query service 270 may implement query tracker 340 in order to manage the execution of queries at compute clusters, track the status of queries, and obtain the resources for the execution of queries from resource management service 290. For example, query tracker 340 may maintain a database or other set of tracking information based on updates received from different managed query service agents implemented on provisioned computing resources (e.g., computing clusters as discussed below with regard to FIGS. 5-7). In some embodiments, query tracker may FIG. 4 is a diagram illustrating interactions between clients and managed query service, according to some embodiments. Client(s) 400 may be client(s) 250 in FIG. 2 above or other clients (e.g., other services systems or components implemented as part of provider network 200 or as part of an external service, system, or component, such as data exploration or visualization tools (e.g., Tableau, Looker, MicroStrategy, Qliktech, or Spotfire). Clients 400 can send various requests to managed query service 270 via managed query interface 310. Managed query interface 310 may offer a management console 440, which may provider a user interface to submit queries 442 (e.g., graphical or command line user interfaces) or register data schemas 444 for executing queries. For example, management console 440 may be implemented as part of a network-based site (e.g., an Internet website for provider network 200) that provides various graphical user interface elements (e.g., text editing windows, drop-down menus, buttons, wizards or workflows) to submit queries or register data schemas. Managed query interface 310 may implement programmatic interfaces 410 (e.g., various Application Programming Interface (API) commands) to perform queries, and various other illustrated requests. In some embodiments, managed query interface 310 may implement custom drivers that support standard communication protocols for querying data, such as JDBC driver 430 or ODBC driver 420.

Clients 400 can submit many different types of request to managed query interface 310. For example, in one embodiment, clients 400 can submit requests 450 to create, read, modify, or delete data schemas. For example, a new table schema can be submitted via a request 450. Request 450 may include a name of the data set (e.g., table), a location of the data set (e.g. an object identifier in an object storage service, such as data storage service 230, file path, uniform resource locator, or other location indicator), number of columns, column names, data types for fields or columns (e.g., string, integer, Boolean, timestamp, array, map, custom data types, or compound data types), data format (e.g., formats including, but not limited to, JSON, CSV, AVRO, ORC, PARQUET, tab delimited, comma separated, as well as custom or standard serializers/desrializers), partitions of a data set (e.g., according to time, geographic location, or other dimensions), or any other schema information for process queries with respect to data sets, in various embodiments. In at least some embodiments, request to create/read/modify/delete data set schemas may be performed using a data definition language (DDL), such as Hive Query Language (HQL). Managed query interface 310 may perform respective API calls or other requests 452 with respect to data catalog service 280, to store the schema for the data set (e.g., as part of table schemas 402). Table schemas 402 may be stored in different formats (e.g., Apache Hive). Note, in other embodiments, managed query service 270 may implement its own metadata store.

Clients 400 may also send queries 460 and query status 470 requests to managed query interface 310 which may direct those requests 460 and 470 to managed query service control plane 320, in various embodiments, as discussed below with regard to FIGS. 5 and 6. Queries 460 may be formatted according to various types of query languages, such as Structured Query Language (SQL) or HQL.

Client(s) 400 may also submit requests for query history 480 or other account related query information (e.g., favorite or common queries) which managed query. In some embodiments, client(s) 400 may programmatically trigger the performance of past queries by sending a request to execute a saved query 490, which managed query service control plane 320 may look-up and execute. For example, execute saved query request may include a pointer or other identifier to a query stored or saved for a particular user account or client. Managed query service control plane 320 may then access that user query store to retrieve and execute the query.

Figure 5:
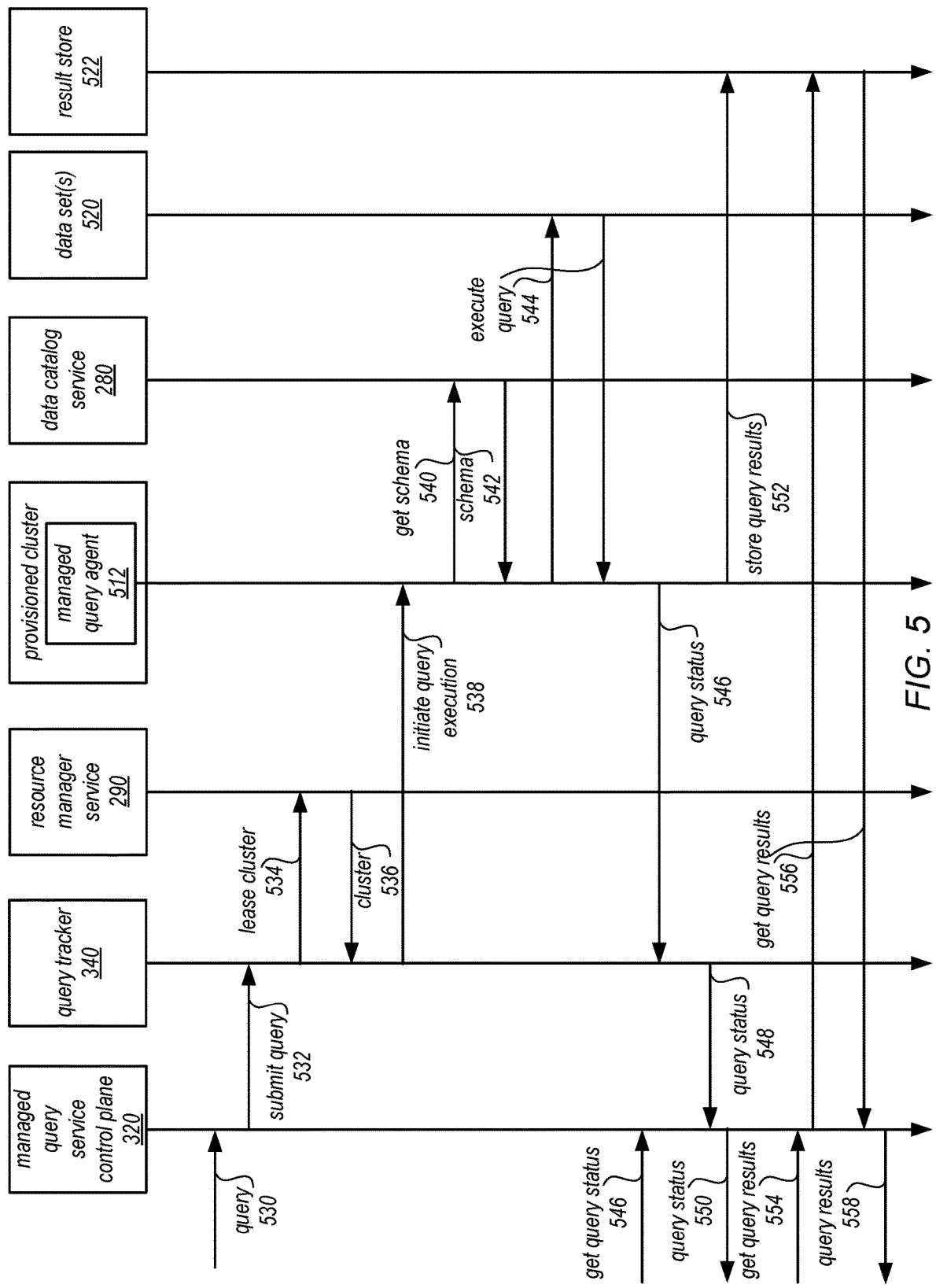
FIG. 5 is a sequence diagram for managed execution of queries, according to some embodiments.
Figure 6:
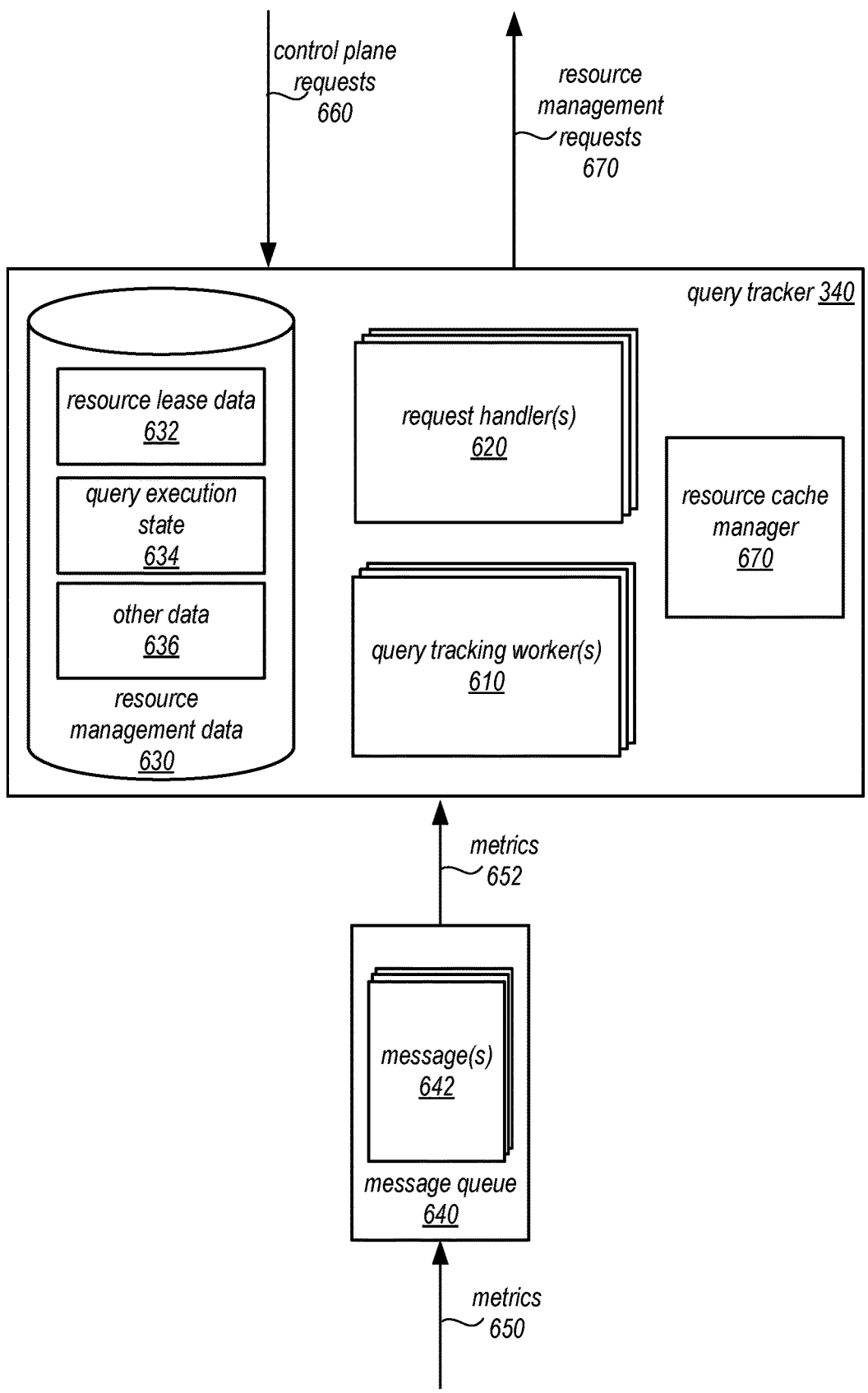
FIG. 6 is a logical block diagram illustrating a query tracker, according to some embodiments.

FIG. 5 is a sequence diagram for managed execution of queries, according to some embodiments. Query 530 may be received at managed query service control plane 320 which may submit the query 532 to query tracker 340 indicating the selected cluster 536 for execution. Query tracker 340 may lease a cluster 534 from resource management service 290, which may return a cluster 536. Resource management service 290 and query tracker 340 may maintain lease state information for resources that are leased by query tracker and assigned to execute received queries. Query tracker 340 may then initiate execution of the query 538 at the provisioned cluster 510, sending a query execution instruction to a managed query agent 512.

Managed query agent 512 may get schema 540 for the data sets(s) 520 from data catalog service 280, which may return the appropriate schema 542. Provisioned cluster 510 can then generate a query execution plan and execute the query 544 with respect to data set(s) 520 according to the query plan. Managed query agent 512 may send query status 546 to query tracker 340 which may report query status 548 in response to get query status 546 request, sending a response 550 indicating the query status 550. Provisioned cluster 510 may store the query results 552 in a result store 522 (which may be a data storage service 230). Managed query service control plane 320 may receive q request to get a query results 554 and get query results 556 from results store 522 and provide the query results 558 in response, in some embodiments.

As discussed above query tracker may receive queries, obtain resources to execute the queries, and track the statutes of queries. FIG. 6 is a logical block diagram illustrating a query tracker, according to some embodiments. In at least some embodiments, query tracker 304 may implement multiple request handlers 620 to service various API calls or requests 660 (e.g., as illustrated above in FIG. 5 from the control plane). The requests may result in further actions, such as sending requests 670 to resource management service 290 (e.g., to obtain a resource from a pool) or other requests to query instance agents for information (e.g., requests for query execution status). Requests handler(s) 620 may implement stateless handling of the requests, in various embodiments, so that any request handler can accept and process a control plane request 670.

In at least some embodiments, request handler(s) 620 may determine whether resource lease data 632 indicates that a leased resource is available and/or appropriate for execute a query received from the control plane. For example, configurations of the different computing resources can be compared with a recommend configuration (e.g., from resource planner 330) to determine which available computing resource is most similar to a desired configuration for executing the query (e.g., query engine type, query engine configuration settings, number of nodes, slots, containers, etc., in the cluster). In some embodiments, as discussed below with regard to FIG. 11, the available computing resources may be made available to those submitters of queries that previously executed at the available computing resources (e.g., available resource A previously executed queries from submitter B, and thus if the query is from submitter B, resource A can be selected). Other selection schemes or techniques may be implemented by request handlers 620. For example, if the available resources are located in different networks, regions, fault tolerant zones, data centers, and the like, a load balancing scheme may be implemented to select from amongst the available computing resources, in one embodiment.

In at least some embodiments, query tracker 340 may implement query tracking worker(s) 610. Query tracking worker(s) 610 may provide distributed tracking techniques for obtaining metrics 650 from cluster agents. For example, query tracker(s) 610 may access a message queue 640 (which may be a separate system or service of provider network 200 in some embodiments) that provides processing of messages 642 in the order in which they are sent from cluster agents. Messages 642 may include various information from the cluster agent, including query execution status, performance metrics, health metrics or any other metrics, states, or events for the cluster or query. Query tracking workers 610 may retrieve messages 642 from message queue in order to get the provided metrics 652. Query tracking workers may then update resource management data 630. For example, query tracking workers 610 may update the resource lease data 632 (e.g., to indicate that a resource is executing a query or is available). Similarly, query tracking workers 610 may update the query execution state (e.g., initializing, executing, running, failed, error, terminated, X % complete, etc.). Other data 636 may be updated with health metrics, billing metrics, or other information used to operate managed query service 270.

Figure 12:
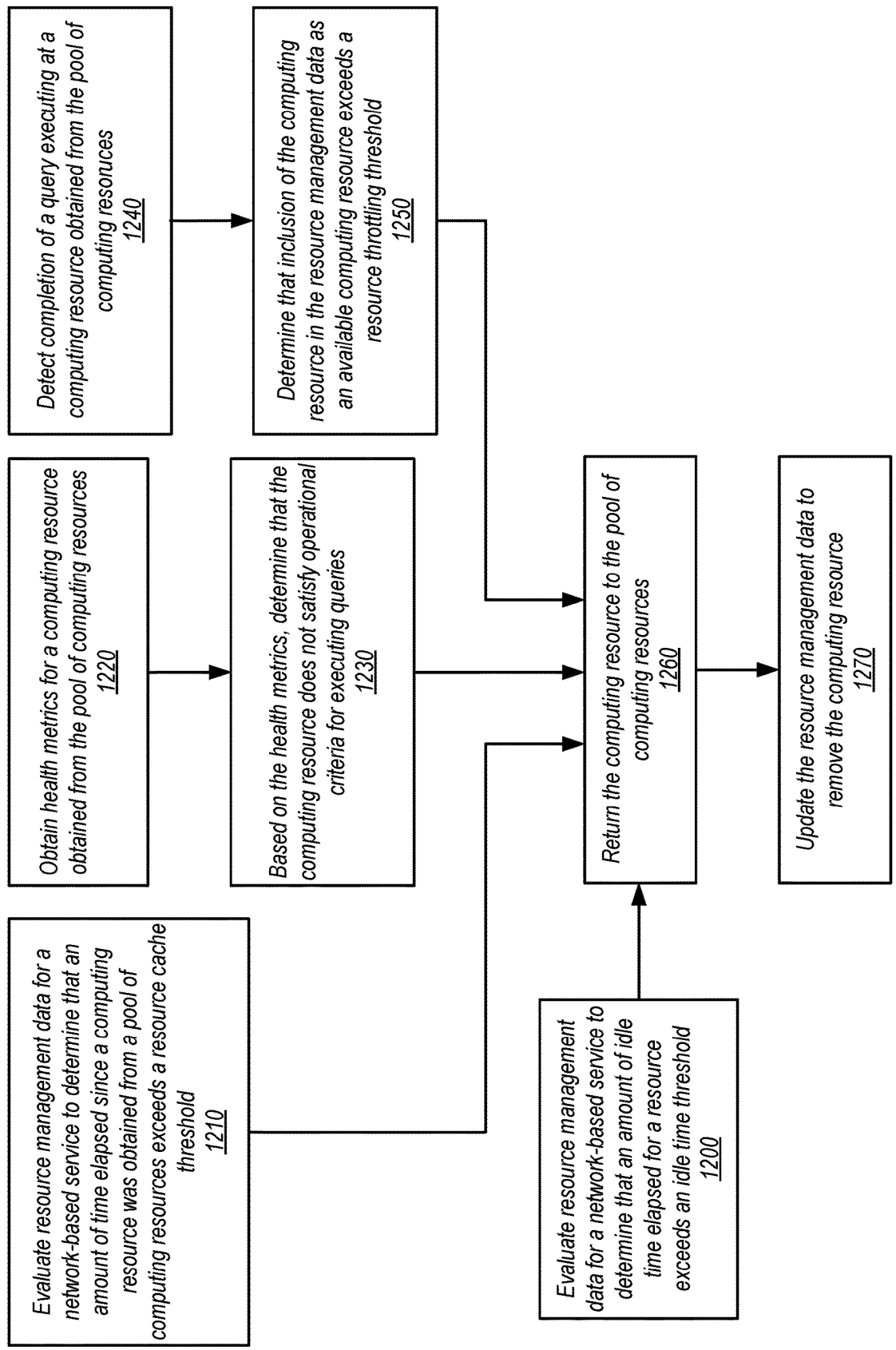
FIG. 12 is a high-level flowchart illustrating methods and techniques to implement returning computing resources to a pool of computing resources, according to some embodiments.

In at least some embodiments, query tracker 340 may implement resource cache manager 670 which may mark or remove resources from being available (e.g., when a request handler determines where or not a resource is present to in resource cache), according to the techniques discussed below with regard to FIG. 12. For example, resource cache manager 670 may implement a background process to sweep resource lease data 632 to identify available resources that have exceeded some purge or removal threshold (e.g., idle time, total leased time) or are unhealthy (e.g., health metrics do not satisfy operational criteria). Resource cache manager 670 may wait until resources are identified as available before purging them from resource lease data, or may purge the resource from resource lease data upon detection even if a query is executing on the resource, in some embodiments.

Figure 7:
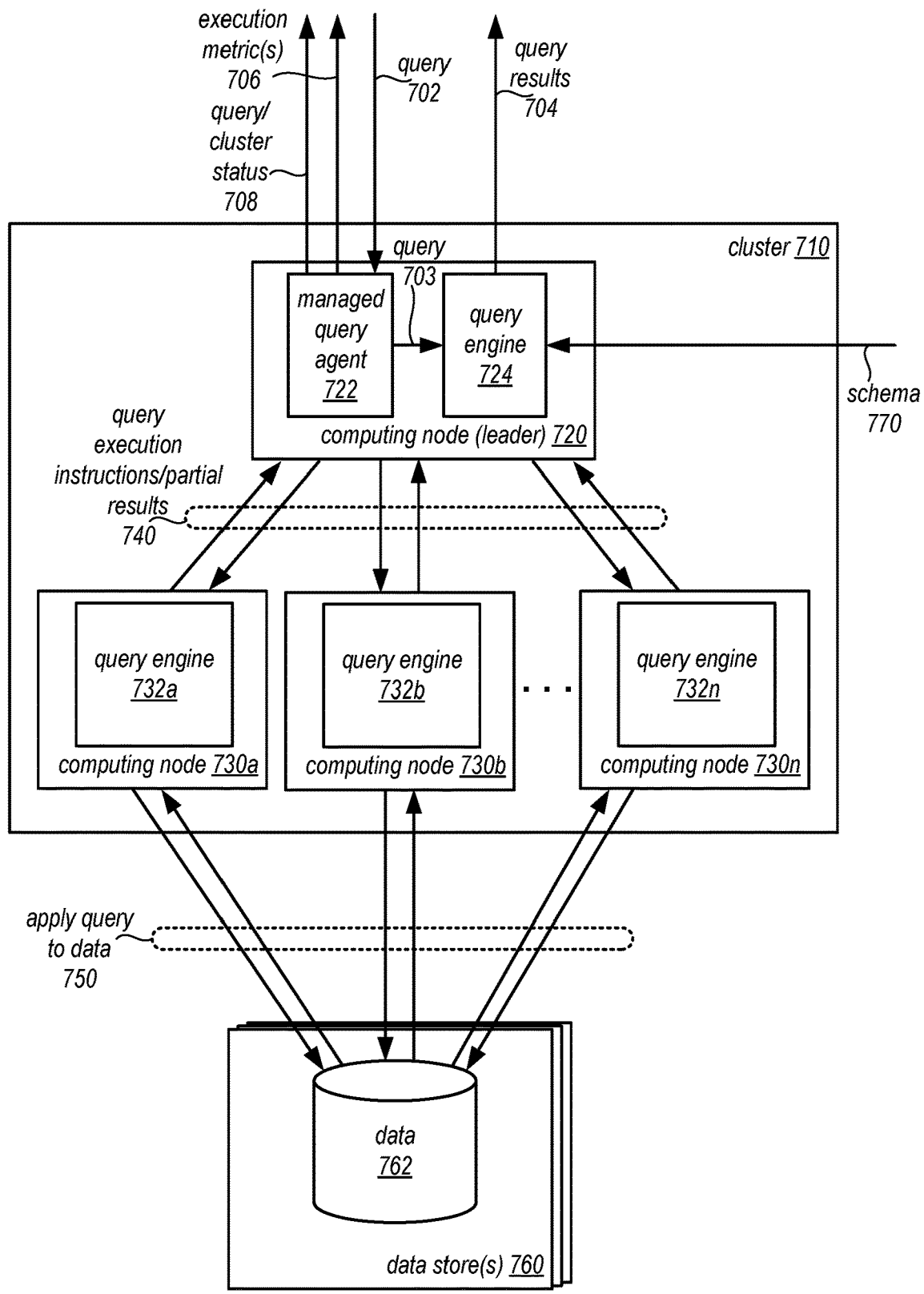
FIG. 7 is a logical block diagram illustrating a cluster processing a query as part of managed query execution, according to some embodiments.

Different types of computing resources may be provisioned and configured in resource pools, in some embodiments. Single-node clusters or multi-node compute clusters may be one example of a type of computing resource provisioned and configured in resource pools by resource management service 290 to service queries for managed query service 270. FIG. 7 is a logical block diagram illustrating a cluster processing a query as part of managed query execution, according to some embodiments. Cluster 710 may implement a computing node 720 that is a leader node (according to the query engine 724 implemented by cluster 710). In some embodiments, no single node may be a leader node, or the leader node may rotate from processing one query to the next. Managed query agent 722 may be implemented as part of leader node 720 in order to provide an interface between the provisioned resource, cluster 710, and other components of managed query service 270 and resource management service 290. For example, managed query agent 722 may provide further data to managed query service 270, such as the status 708 of the query (e.g. executing, performing I/O, performing aggregation, etc.,) and execution metrics 706 (e.g., health metrics, resource utilization metrics, cost metrics, length of time, etc.). In some embodiments, managed query agent 722 may provide cluster/query status 708 and execution metric(s) 706 to resource management service 290 (in order to make pool management decisions, such as modification events, lease requests, etc.). For example, managed query agent 722 may indicate cluster status 708 to resource management service 290 indicating that a query has completed and that the cluster 710 is ready for reassignment (or other resource lifecycle operations).

Leader node 720 may implement query engine 724 to execute queries, such as query 702 which may be received via managed query agent 722 as query 703. For instance, managed query agent may implement a programmatic interface for query tracker to submit queries (as discussed above in FIGS. 5 and 6), and then generate and send the appropriate query execution instruction to query engine 724. Query engine 724 may generate a query execution plan for received queries 703. In at least some embodiments, leader node 720, may obtain schema information for the data set(s) 770 from the data catalog service 280 or metadata stores for data 762 (e.g., data dictionaries, other metadata stores, other data processing services, such as database systems, that maintain schema information) for data 762, in order to incorporate the schema data into the generation of the query plan and the execution of the query. Leader node 720 may generate and send query execution instructions 740 to computing nodes that access and apply the query to data 762 in data store(s) 760. Compute nodes, such as nodes 730a, 730b, and 730n, may respectively implement query engines 732a, 732b, and 732n to execute the query instructions, apply the query to the data 750, and return partial results 740 to leader node 720, which in turn may generate and send query results 704. Query engine 724 and query engines 732 may implement various kinds of distributed query or data processing frameworks, such as the open source Presto distributed query framework or the Apache Spark framework.

Figure 8:
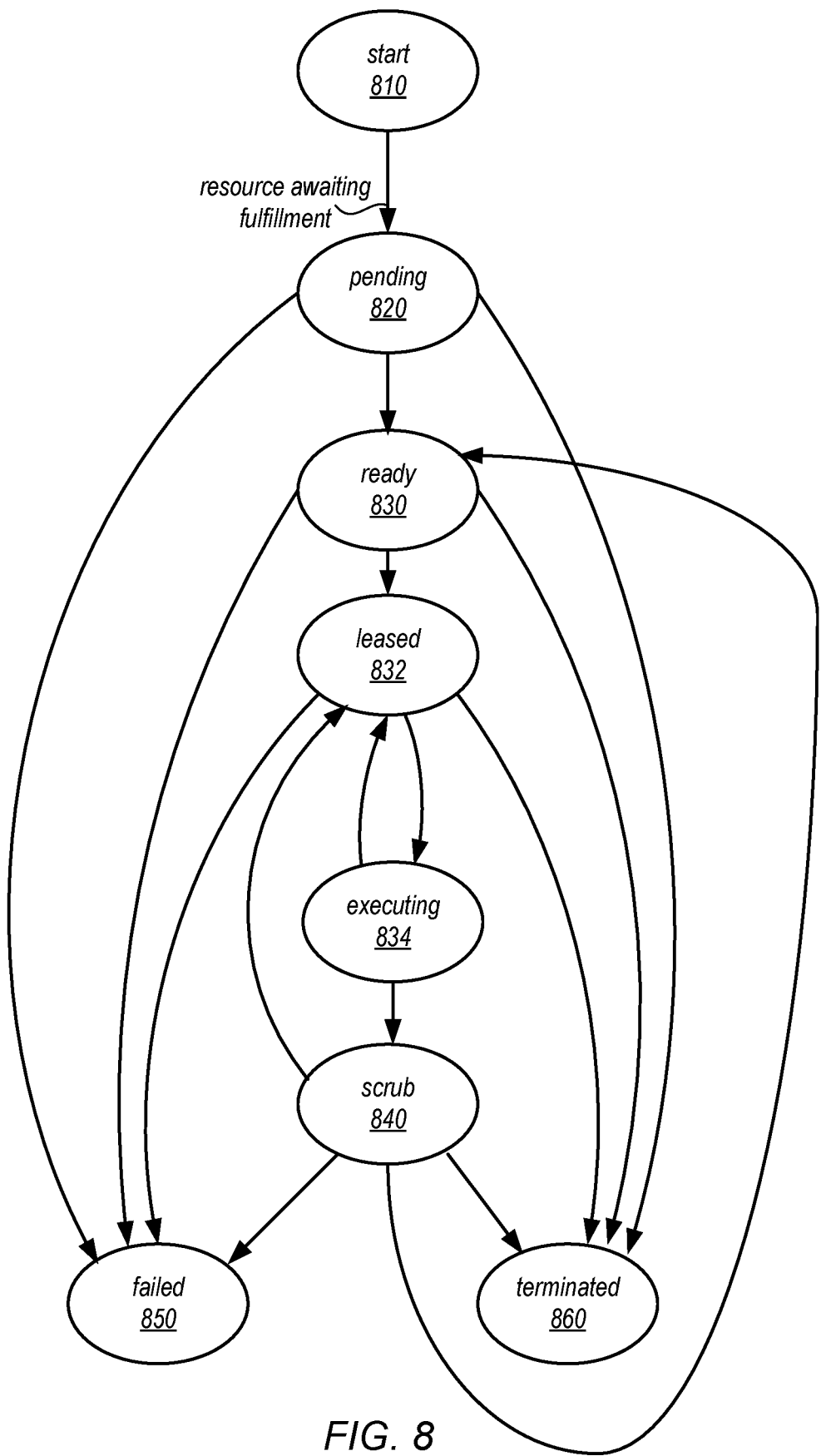
FIG. 8 is a state diagram illustrating different resource states tracked, detected, or identified by a management agent, according to some embodiments.

FIG. 8 is a state diagram for resources implemented in a resource pool, according to some embodiments. A resource may begin in start state 810 awaiting fulfillment. A pending resource 820 may be a resource that has been launched but is not yet configured for processing jobs (e.g., according to a configured specified for resources in the pool, such as the query image, machine image, software applications, etc.). If an error occurs while provisioning, then the resource may be in failed state 850, which would make the resource unable to be available to process jobs as part of the pool (and may not be counted for idle or overall resource count considerations, in some embodiments. For example, a machine image may crash or fail to load properly at one or more nodes in a cluster, in one embodiment, failing the provisioning of the resource.

For resources that are successful configured to execute jobs, the resource state may transition to ready 830. In ready state 830, a resource may be idle or leased to execute a job. A resource may transition out of ready state in the event of resource failure (to failed state 850) or in the event of the resource being terminated (to terminated state 860). Termination of a resource may, in some embodiments, occur after a time limit or other usage threshold that limits the amount of work done by a given resource. In this way, a resource that suffers from performance decline (e.g., due to age, software errors that cause memory leaks or other performance problems) or may be vulnerable to security breach can be terminated (and replaced in the pool with another resource). A ready resource may be leased 832 (where it may be idle or in executing state 834). When a query is routed to a resource, then the resource may move to executing state 834. Upon completing execution of job, a resource may be returned to leased state 832 or move to scrub state 840, in some embodiments. For example, a managed query agent may detect when a cluster has completed execution of the query and report a query completion status to resource management service 290. The managed query agent may then initiate an operation to scrub the resource for reuse in the resource pool. Scrubbed resources may return to resource pool by becoming in ready state 830. In some embodiments, a scrubbed resource that fails to complete a scrub operation may move to failed state 850 or may be terminated (e.g., due to an age/time limit for the resource). Resources may be moved from leased state 832 to scrubbed state 840 (e.g., for various reasons discussed below with regard to FIG. 12).

Figure 9:
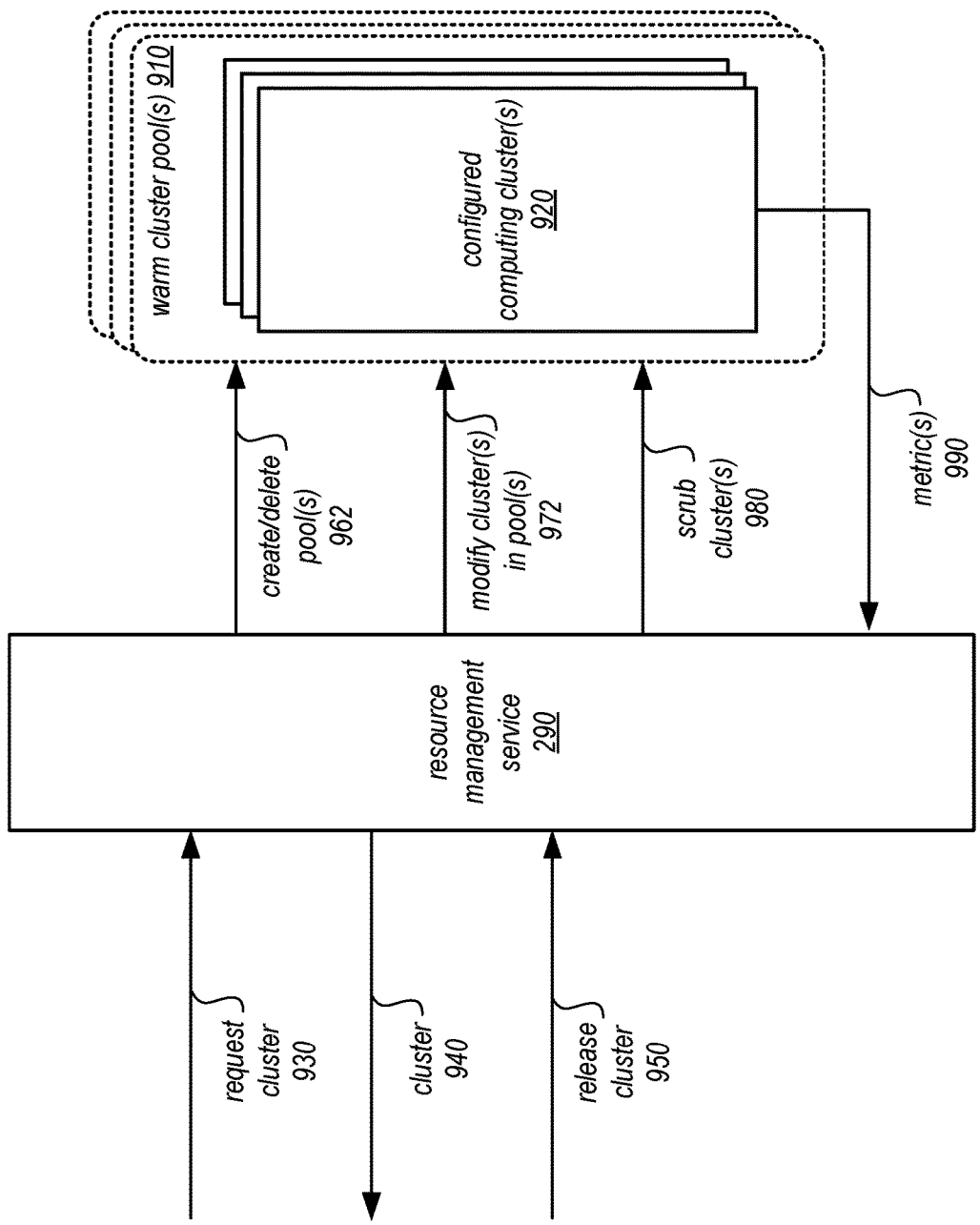
FIG. 9 is logical block diagram illustrating interactions between a resource management service and pools of resources, according to some embodiments.

FIG. 9 is logical block diagram illustrating interactions between a resource management service and pools of resources, according to some embodiments. Resource management service 290 may implement a programmatic interface (e.g., API) or other interface that allows other network-based services (or a client or a provider network) to submit requests for preconfigured resources from a resource pool managed by resource management service 290. For example, a request for a cluster 930 may be received (e.g., from query tracker 340) to obtain a cluster to execute a query. Resource management service 290 may determine the appropriate pool for the request 930, a randomly (or selectively according to the submitter of the request, type of query, etc.) determine a cluster for servicing the request. Resource management service 290 may then provide the identified cluster 940 (e.g., by specifying a location, identifier, or other information for accessing the identified computing resource. Resource management service may update state information for the cluster to indicate that the cluster is leased or otherwise unavailable. Resource management service 290 may also receive requests to release a cluster 950 from a current assignment. Resource management service 290 may then update state information (e.g., the lease) for the cluster and pool to return the cluster to the pool, in some embodiments.

As indicated at 960, resource management service 290 may automatically (or in response to requests (not illustrated)), commission or decommission pool(s) of clusters 910. For example in some embodiments, resource management service 290 may perform techniques that select the number and size of computing clusters 920 for the warm cluster pool 910. The number and size of the computing clusters 920 in the warm cluster pool 910 can be determined based upon a variety of factors including, but not limited to, historical and/or expected volumes of query requests, the price of the computing resources utilized to implement the computing clusters 920, and/or other factors or considerations, in some embodiments.

Once the number and size of computing clusters 920 has been determined, the computing clusters 920 may be instantiated, such as through the use of an on-demand computing service, or virtual compute service or data processing service as discussed above in FIG. 2. The instantiated computing clusters 920 can then be configured to process queries prior to receiving the queries at the managed query service. For example, and without limitation, one or more distributed query frameworks or other query processing engines can be installed on the computing nodes in each of the computing clusters 920. As discussed above, in one particular implementation, the distributed query framework may be the open source PRESTO distributed query framework. Other distributed query frameworks can be utilized in other configurations. Additionally, distributed processing frameworks or other query engines can also be installed on the host computers in each computing cluster 920. As discussed above, the distributed processing frameworks can be utilized in a similar fashion to the distributed query frameworks. For instance, in one particular configuration, the APACHE SPARK distributed processing framework can also, or alternately, be installed on the host computers in the computing clusters 920.

Instantiated and configured computing clusters 920 that are available for use by the managed query service 270 are added to the warm cluster pool 910, in some embodiments. A determination can be made as to whether the number or size of the computing clusters 920 in the warm cluster pool needs is to be adjusted, in various embodiments. The performance of the computing clusters 920 in the warm cluster pool 910 can be monitored based on cluster metric(s) 990 received from the cluster pool. The number of computing clusters 920 assigned to the warm cluster pool 910 and the size of each computing cluster 920 (i.e. the number of host computers in each computing cluster 920) in the warm cluster pool 910 can then be adjusted. Such techniques can be repeatedly performed in order to continually optimize the number and size of the computing clusters 920 in the warm cluster pool 910.

As indicated at 980, in some embodiments, resource management service 270 may scrub clusters(s) 980, (e.g., as a result of the lease state transitioning to expired or terminated) by causing the cluster to perform operations (e.g., a reboot, disk wipe, memory purge/dump, etc.) so that the cluster no longer retains client data and is ready to process another query. For example, resource management service 290 may determine whether a computing cluster 920 is inactive (e.g. the computing cluster 920 has not received a query in a predetermined amount of time). If resource management service 290 determines that the computing cluster 920 is inactive, then the computing cluster 920 may be disassociated from the submitter of the query. The computing cluster 920 may then be "scrubbed," such as by removing data associated with the query and/or submitter of the queries from memory (e.g. main memory or a cache) or mass storage device (e.g. disk or solid state storage device) utilized by the host computers in the computing cluster 920. The computing cluster 920 may then be returned to the warm cluster pool 910 for use in processing other queries. In some embodiments, some clusters that are inactive might not be disassociated from certain users in certain scenarios. In these scenarios, the user may have a dedicated warm pool of clusters 910 available for their use.

Figure 10:
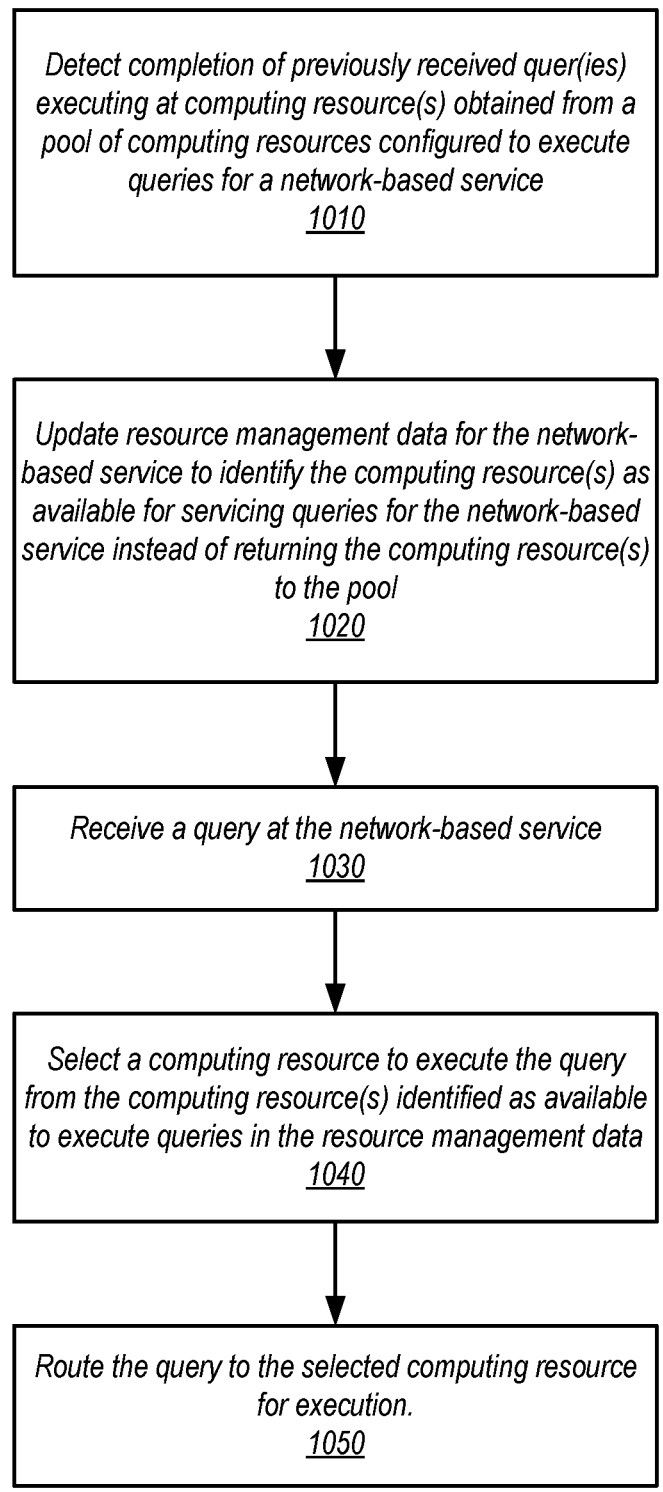
FIG. 10 is a high-level flowchart illustrating methods and techniques to implement tracking query execution status for selectively routing queries, according to some embodiments.

Although FIGS. 2-9 have been described and illustrated in the context of a provider network implementing a managed query service to execute received queries, the various components illustrated and described in FIGS. 2-9 may be easily applied to other systems, or devices that manage the execution of queries. As such, FIGS. 2-9 are not intended to be limiting as to other embodiments of a system that may implement tracking query execution status for selectively routing queries. FIG. 10 is a high-level flowchart illustrating methods and techniques to implement tracking query execution status for selectively routing queries, according to some embodiments. Various different systems and devices may implement the various methods and techniques described below, either singly or working together. For example, a query tracker as described above with regard to FIGS. 2-9 may implement the various methods. Alternatively, a combination of different systems and devices may implement these methods. Therefore, the above examples and or any other systems or devices referenced as performing the illustrated method, are not intended to be limiting as to other different components, modules, systems, or configurations of systems and devices.

As indicated at 1010, completion of previously received quer(ies) executing a computing resource(s) obtained from a pool of computing resources configured to execute queries for a network-based service may be detected, in various embodiments. For example, a distributed tracking system, such as described above with regard to FIG. 6 and discussed below with regard to FIG. 11 may be implemented to distribute the work of monitoring the query execution status, as well as information obtained from computing resources executing queries (e.g., health metrics, performance metrics, etc.), amongst multiple query tracking nodes that obtain the metrics, status, or other events from a message queue. In some embodiments, a non-distributed tracking system may be implemented (e.g., with one monolithic tracking system), or a distributed tracking system that assigns specific trackers to specific computing resources. In some embodiments, a poll-based technique be implemented to obtain information, such as the completion of queries by periodically pinging or requesting computing resources for query status.

As indicated at 1020, resource management data for the network-based service may be updated to identify the computing resource(s) as available for servicing queries for the network-based service instead of returning the computing resource(s) to the pool, in some embodiments. A lease table, state table, or other metadata structure (e.g., an availability list or queue of available resources) for computing resources may be marked, inserted, indicated, or otherwise updated to include identity of the resource that is available. In some embodiments, other information for the resource, such as the time elapsed since creation may be updated when making the resource available, in some embodiments. Not all resources that complete execution of a query may be made available. For example, as discussed below with regard to FIG. 12, computing resources may be returned to the pool instead of being made available if, for example, including the resource would exceed a throttle threshold, if the resource is unhealthy, or if the resource's lease has expired, in various embodiments.

As indicated at 1030, a query may be received at the network-based service, in some embodiments. The query may be received that is directed to data set(s) separately stored in remote data stores, in various embodiments. For example, a query may be received via the various types of interfaces described above with regard to FIG. 4 (programmatic, user console, driver, etc.), in one embodiment. A query may be formatted according to different query languages, or specifications of query languages including Structured Query Language (SQL) and/Hive Query Language (HQL). The query may include execution hints, specifying the type of query execution engine to utilize, query execution limits, or other parameters or properties for configuring the execution of the query, in some embodiments.

As indicated at 1040, a computing resource from the computing resource(s) identified as available to execute queries in the resource management data may be selected, in various embodiments. For example, the configurations of the different computing resources can be compared with a recommend configuration (e.g., from resource planner 330) to determine which available computing resource is most similar to a desired configuration for executing the query (e.g., query engine type, query engine configuration settings, number of nodes, slots, containers, etc., in the cluster). In some embodiments, as discussed below with regard to FIG. 11, the available computing resources may be made available to those submitters of queries that previously executed at the available computing resources (e.g., available resource A previously executed queries from submitter B, and thus if the query is from submitter B, resource A can be selected). Other selection schemes or techniques may be implemented. For example, if the available resources are located in different networks, regions, fault tolerant zones, data centers, and the like, a load balancing scheme may be implemented to select from amongst the available computing resources, in one embodiment.

As indicated at 1050, the query may be routed to the selected resource, according to some embodiments. For example, a request to initiate or begin processing at the selected computing resource(s) may be performed, in some embodiments, according to an API request or the query may be initiated by transmitting the query in its original format to the computing resources for execution.

Figure 11:
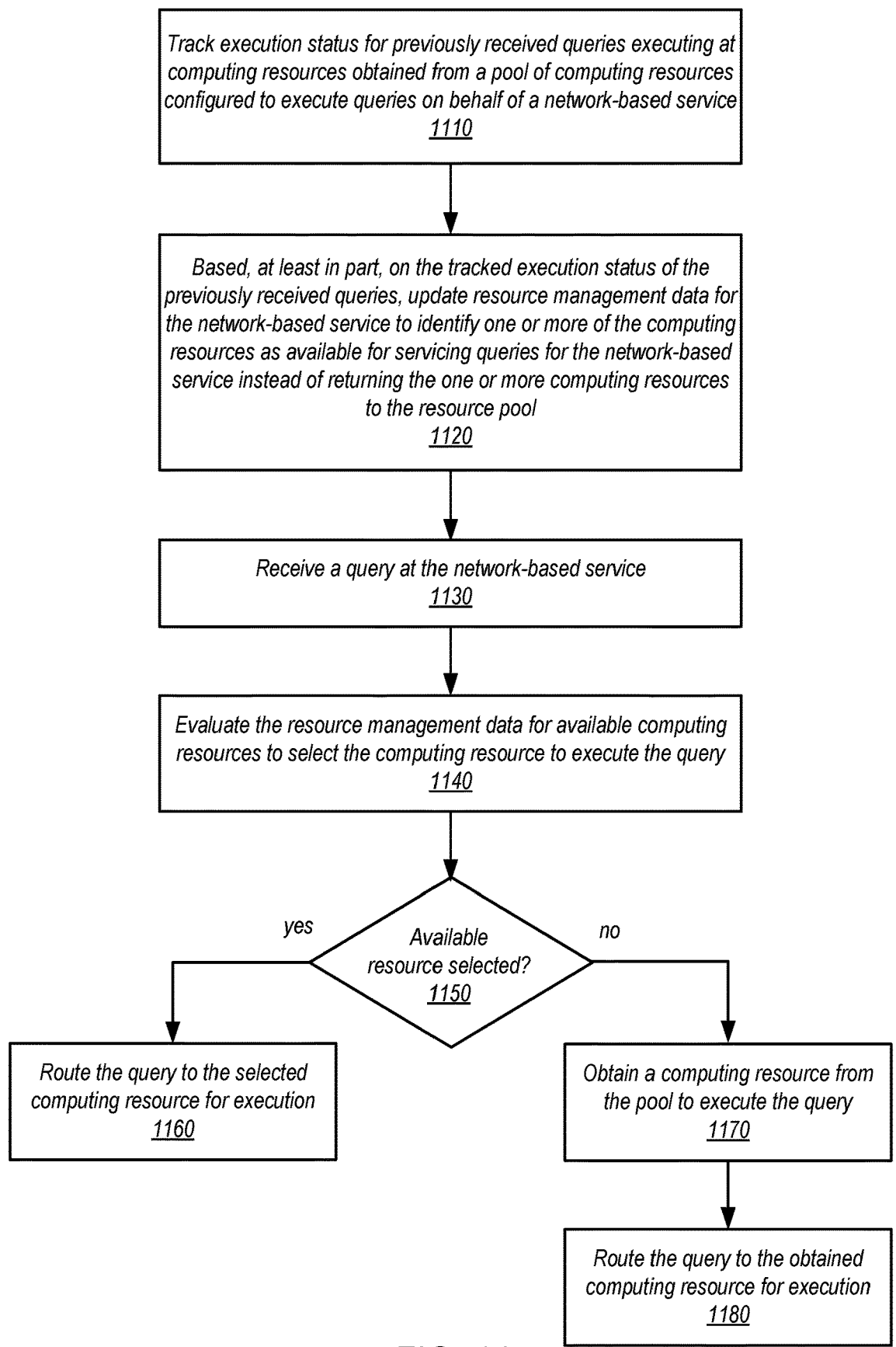
FIG. 11 is a high-level flowchart illustrating methods and techniques to implement evaluating resource management data to select resources to execute queries, according to some embodiments.

FIG. 11 is a high-level flowchart illustrating methods and techniques to implement evaluating resource management data to select resources to execute queries, according to some embodiments. As indicated at 1110, execution status for previously received queries executing a computing resources obtained from a pool of computing resources configured to execute queries on behalf of a network-based service may be tracked, in various embodiments. For example, as discussed above, a set of query tracking workers, nodes, hosts, servers, or other distributed components may monitor or check for status updates from the computing resources, in some embodiments. A message queue, for instance, may be used to communicate status changes so that the status changes are received according to an ordering (e.g., FIFO) so that status changes (e.g., for a same computing resource) may be processed in the order that they are sent. The message queue may be shared by multiple query tracking workers and multiple computing resources to report query execution status. Other metrics (e.g., health metrics, performance metrics, etc.) or events (e.g., a network failure event) may also be detected and reported via the message queue. Other tracking techniques may include poll-based techniques that sweep the different computing resources with requests to update the execution status of a query, in some embodiments. As noted above, query execution status may be based on states, such as "initializing, running, terminating, failing, or complete" or a completion metric (e.g., 10% complete, 95% complete, etc.).

As indicated at 1120, resource management data for the network-based service may be updated to identify the computing resource(s) as available for servicing queries for the network-based service instead of returning the computing resource(s) to the pool, in some embodiments, based at least in part on the tracked execution status. For instance, a change in execution status from running to complete may trigger the update to the resource management data (e.g., performed by a query tracking worker updating the status in the lease data in FIG. 6), in one embodiment. Other status changes, such as change to terminated (e.g., because a client requested that the query be stopped or a managed query service component halted the query to limit costs) may trigger the update to the resource management data. Resource management data may be a lease table, state table, or other metadata structure (e.g., an availability list or queue of available resources) for computing resources may be marked, inserted, indicated, or otherwise updated to include identity of the resource that is available. In some embodiments, other information for the resource, such as the time elapsed since creation may be updated when making the resource available, in some embodiments. As noted above, not all resources that complete execution of a query may be made available. For example, as discussed below with regard to FIG. 12, computing resources may be returned to the pool instead of being made available if, for example, including the resource would exceed a throttle threshold, if the resource is unhealthy, or if the resource's lease has expired, in various embodiments.

As indicated at 1130, a query may be received at the network-based service, in some embodiments. The query may be received that is directed to data set(s) separately stored in remote data stores, in various embodiments. For example, a query may be received via the various types of interfaces described above with regard to FIG. 4 (programmatic, user console, driver, etc.), in one embodiment. A query may be formatted according to different query languages, or specifications of query languages including Structured Query Language (SQL) and/Hive Query Language (HQL). The query may include execution hints, specifying the type of query execution engine to utilize, query execution limits, or other parameters or properties for configuring the execution of the query, in some embodiments.

As indicated at 1140, the resource management data may be evaluated for available computing resources to select the computing resource to execute the query, in various embodiments. For example, a resource list may be scanned or evaluated to determine a next available resource to be assigned. In some embodiments, available resources may be categorized by type (e.g., query engine type) or by submitter (e.g., user identifier, source network address, etc.). Depending on the query, the evaluation may (or may not) select an available resource (as discussed below with regard to FIG. 12). For instance, queries may only be able to select an available resource of the same type (e.g., same query engine) or the same submitter (e.g., same user identifier). In this way, resources that are optimally configured for certain queries or resources that would potentially provide access to a submitter's data may be limited to those queries that can use that configuration or have access to that submitter's data.

If an available resource is selected, then as indicated at 1160, the query may be routed to the selected resource, according to some embodiments. For example, a request to initiate or begin processing at the selected computing resource(s) may be performed, in some embodiments, according to an API request or the query may be initiated by transmitting the query in its original format to the computing resources for execution.

If an available resource is not selected for executing the query, as indicated by the negative exit from 1150, then a resource may be obtained to execute the query from the pool, as indicated at 1170, in various embodiments. For example, as discussed above with regard to FIGS. 5 and 9, a request may be made to a pool manager, such as resource management service 290, to obtain a new computing resource from a pool (e.g., with a particular query engine type, query engine settings, or number of nodes, slots, or containers). As indicated at 1170, the query may be routed to the obtained resource, according to some embodiments. For example, a request to initiate or begin processing at the selected computing resource(s) may be performed, in some embodiments, according to an API request or the query may be initiated by transmitting the query in its original format to the computing resources for execution.

Computing resources may be returned to the pool of computing resources in different scenarios. FIG. 12 is a high-level flowchart illustrating methods and techniques to implement returning computing resources to a pool of computing resources, according to some embodiments. As indicated at 1200, resource management data for a network-based service may be evaluated to determine that an amount of idle time for a resource elapsed exceeds an idle time threshold, in some embodiments. For example, if a resource remains available but not assigned for longer than 5 minutes, then the resource may be returned to the pool, as indicated at 1260. In some embodiments, the idle time threshold may be modified (e.g., extended or shortened) so that subsequent resources (e.g., the same type or submitter/user account) may have a shorter or longer time that resources are made available. For example, the idle time threshold may be dynamically changed based on the demand upon the managed query service, the greater the demand, the shorter the idle time threshold (and vice versa), in some embodiments.

As indicated at 1210, resource management data for a network-based service may be evaluated to determine that an amount of time elapsed since a computing resource was obtained from a pool of computing resources exceeds a resource cache threshold, in some embodiments. For example, the resource management data may include a lease obtained timestamp that indicates when a computing resource was leased from a pool of computing resource. The amount of elapsed time may be determined and compared with the resource cache threshold (e.g., specified in seconds, minutes, hours, etc.). In some embodiments, the amount of time elapsed may be inherently determined by evaluating an expiration date or time maintained for a computing resource in the resource management data. Once a current date or time exceeds the expiration date or time, then the resource may be determined to have an amount of time elapsed since obtaining the resource greater than the resource cache threshold.

In some embodiments, the resource cache threshold may be different for individual computing resources, different types of computing resources, or computing resources associated with a particular submitter or user account. Thus, some computing resources may be cached or otherwise made available for executing queries longer than other computing resources obtained at the same or a later time. In some embodiments, the resource cache threshold may be modified (e.g., extended or shortened) so that subsequent resources (e.g., the same type or submitter/user account) may have a shorter or longer time that resources are made available. For example, the resource cache threshold may be dynamically changed based on the demand upon the managed query service, the greater the demand, the shorter the resource cache threshold (and vice versa), in some embodiments.

As indicated at 1220, in some embodiments health metrics may be obtained for a computing resource that is obtained from the pool of computing resources. The health metrics may indicate various characteristics of the operation of a computing resource, such as the average latency in processing a request, number of available nodes, slots or containers available out of an assigned, reserved, or allocated number of nodes slots, or containers supposed to be active in the computing resource, network-speed, network bandwidth utilization, storage capacity, processor utilization, or any other metric that may indicate the computing resource is performing sub-optimally. The health metrics may be obtained according to the various tracking techniques discussed above with regard to FIG. 11 (e.g., distributed tracking via message queue, polling, etc.).

As indicated at 1230, based on the health metrics, a determination may be made that the computing resource does not satisfy the operational criteria for executing queries, in some embodiments. For example, a maximum average latency, processor utilization, number of active nodes, slots, or containers, may be specified as operational criteria in order to ensure that queries execute within some limitation, expectation, cost, timeframe, etc. The health metrics may be compared with the operational criteria for executing queries and if one or more of the criteria are not satisfied, then the computing resources may be deemed as unable to operate, in some embodiments.

As indicated at 1240, completion of a query executing at a computing resource obtained from a pool of computing resources may be detected (e.g., as discussed above with regard to FIG. 10). As indicated at 1250, a determination may be made that inclusion of the computing resource in the resource management data as an available computing resource exceeds a resource throttling threshold. For example, the resource management threshold may be specific to a type of computing resource (e.g., a type of query engine) or to a submitter of queries (e.g., according to user identifier, network address, etc.). If the resource is to be returned as available for the type or submitter, then the resource throttling threshold for the type or submitter may be evaluated. For example, a resource throttling threshold may limit a submitter to 10 cached computing resources. If the resource attempting to be included as available would result in 11 cached computing resources for the submitter, then the resource may not be included in as available. In some embodiments, the resource management threshold may be modified (e.g., extended or shortened) so that subsequent resources (e.g., the same type or submitter/user account) may not starve other users or accounts for resources. For example, the resource management threshold may be dynamically changed based on the demand upon the managed query service, the greater the demand, the shorter the resource management threshold (and vice versa), in some embodiments.

As indicated at 1260, resources may be returned to the pool of computing resources, in various embodiments. For example, a request to release the resource may be sent to a pool manager, such as pool management service 290, indicating the resource to return to the pool. In some embodiments, a scrub operation, as discussed above with regard to FIG. 9 may be performed to remove data associated with a submitter of a query or the query itself that completed. Once returned, as indicated at 1270, the resource management data may be updated to remove the computing resource, in various embodiments. For example, the lease information for the resource may be deleted, removed, or otherwise marked as unavailable.

The methods described herein may in various embodiments be implemented by any combination of hardware and software. For example, in one embodiment, the methods may be implemented by a computer system (e.g., a computer system as in FIG. 15) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 13:
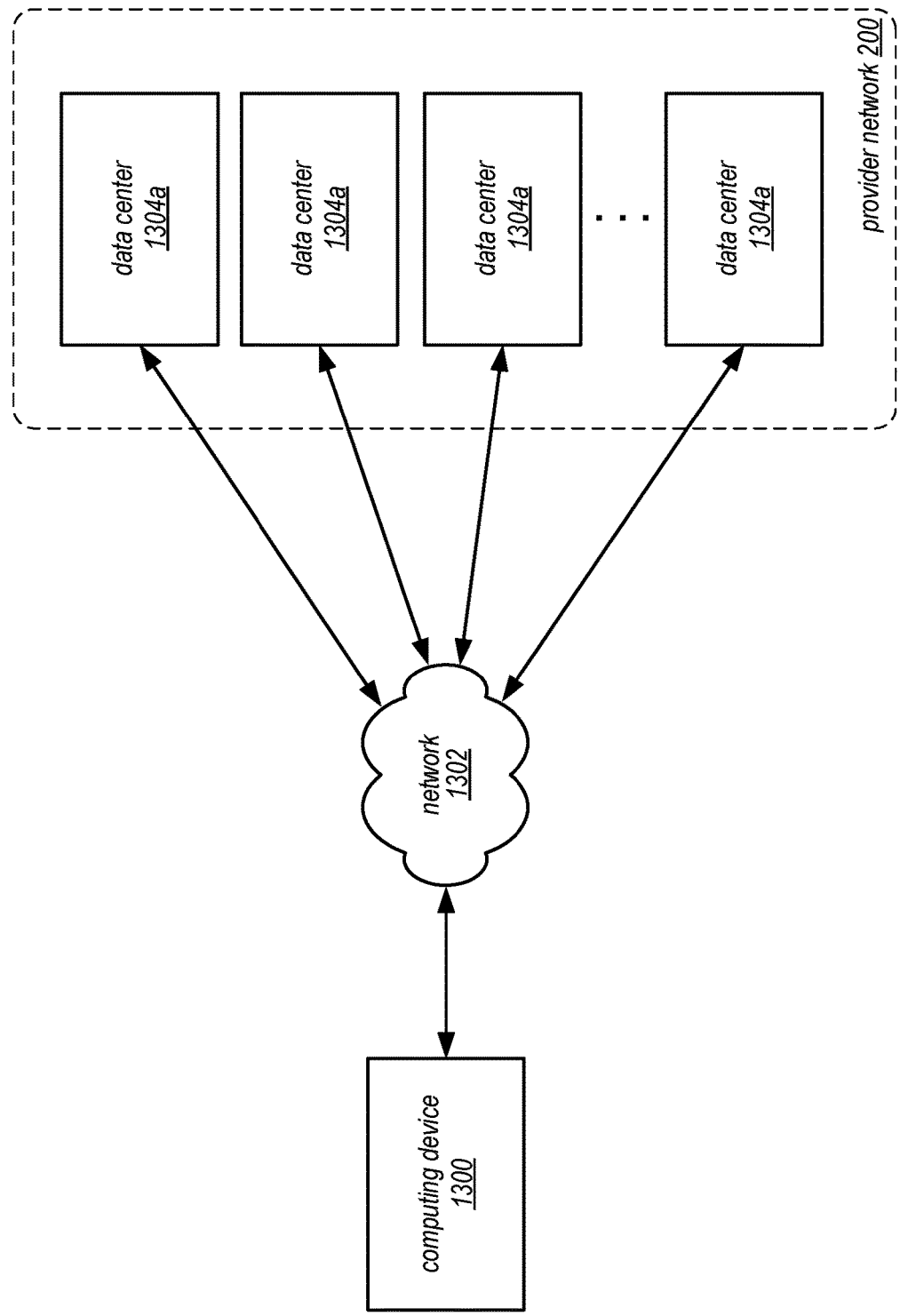
FIG. 13 is a logical block diagram that shows an illustrative operating environment that includes a service provider network that can be configured to implement aspects of the functionality described herein, according to some embodiments.

FIG. 13 is a logical block diagram that shows an illustrative operating environment that includes a service provider network that can implement aspects of the functionality described herein, according to some embodiments. As discussed above, the service provider network 200 can provide computing resources, like VM instances and storage, on a permanent or an as-needed basis. Among other types of functionality, the computing resources provided by the service provider network 200 can be utilized to implement the various services described above. As also discussed above, the computing resources provided by the service provider network 200 can include various types of computing resources, such as data processing resources like VM instances, data storage resources, networking resources, data communication resources, network services, and the like.

Each type of computing resource provided by the service provider network 200 can be general-purpose or can be available in a number of specific configurations. For example, data processing resources can be available as physical computers or VM instances in a number of different configurations. The VM instances can execute applications, including web servers, application servers, media servers, database servers, some or all of the services described above, and/or other types of programs. The VM instances can also be configured into computing clusters in the manner described above. Data storage resources can include file storage devices, block storage devices, and the like. The service provider network 200 can also provide other types of computing resources not mentioned specifically herein.

The computing resources provided by the service provider network maybe implemented, in some embodiments, by one or more data centers 1304A-1304N (which might be referred to herein singularly as "a data center 1304" or in the plural as "the data centers 1304"). The data centers 1304 are facilities utilized to house and operate computer systems and associated components. The data centers 1304 typically include redundant and backup power, communications, cooling, and security systems. The data centers 1304 can also be located in geographically disparate locations. One illustrative configuration for a data center 1304 that can be utilized to implement the technologies disclosed herein will be described below with regard to FIG. 13.

The customers and other users of the service provider network 200 can access the computing resources provided by the service provider network 200 over a network 1302, which can be a wide area communication network ("WAN"), such as the Internet, an intranet or an Internet service provider ("ISP") network or a combination of such networks. For example, and without limitation, a computing device 1300 operated by a customer or other user of the service provider network 200 can be utilized to access the service provider network 200 by way of the network 1302. It should be appreciated that a local-area network ("LAN"), the Internet, or any other networking topology known in the art that connects the data centers 1304 to remote customers and other users can be utilized. It should also be appreciated that combinations of such networks can also be utilized.

Figure 14:
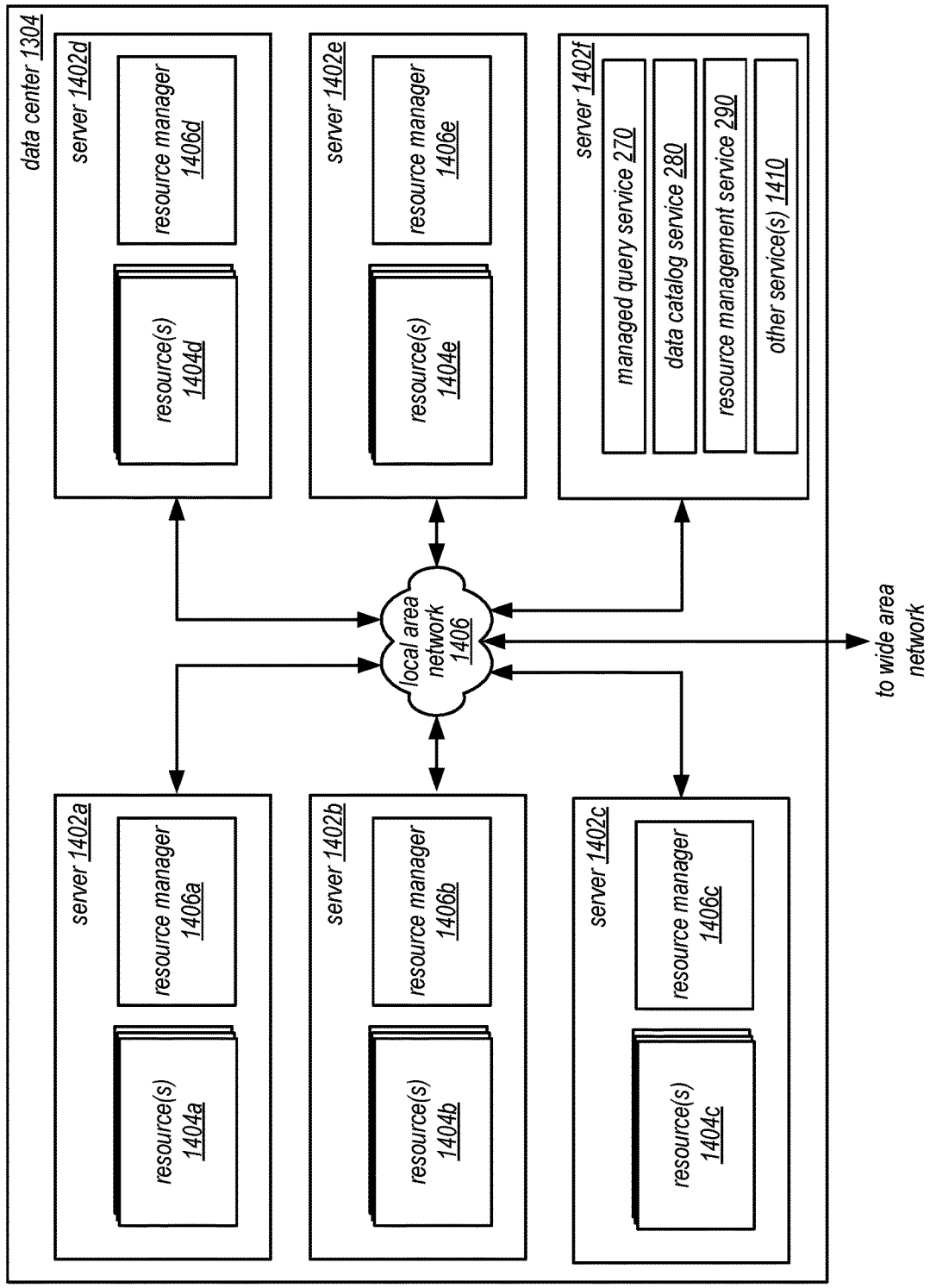
FIG. 14 is a logical block diagram illustrating a configuration for a data center that can be utilized to implement aspects of the technologies disclosed herein, according to some embodiments.

FIG. 14 is a logical block diagram illustrating a configuration for a data center that can be utilized to implement aspects of the technologies disclosed herein, according to various embodiments. is a computing system diagram that illustrates one configuration for a data center 1304 that implements aspects of the technologies disclosed herein for providing managed query execution, such as managed query execution service 270, in some embodiments. The example data center 1304 shown in FIG. 14 includes several server computers 1402A-1402F (which might be referred to herein singularly as "a server computer 1402" or in the plural as "the server computers 1402") for providing computing resources 1404A-1404E.

The server computers 1402 can be standard tower, rackmount, or blade server computers configured appropriately for providing the computing resources described herein (illustrated in FIG. 14 as the computing resources 1404A-1404E). As mentioned above, the computing resources provided by the provider network 200 can be data processing resources such as VM instances or hardware computing systems, computing clusters, data storage resources, database resources, networking resources, and others. Some of the servers 1402 can also execute a resource manager 1406 capable of instantiating and/or managing the computing resources. In the case of VM instances, for example, the resource manager 1406 can be a hypervisor or another type of program may enable the execution of multiple VM instances on a single server computer 1402. Server computers 1402 in the data center 1404 can also provide network services and other types of services, some of which are described in detail above with regard to FIG. 2.

The data center 1304 shown in FIG. 14 also includes a server computer 1402F that can execute some or all of the software components described above. For example, and without limitation, the server computer 1402F can execute various components for providing different services of a provider network 200, such as the managed query service 270, the data catalog service 280, resource management service 290, and other services 1410 (e.g., discussed above) and/or the other software components described above. The server computer 1402F can also execute other components and/or to store data for providing some or all of the functionality described herein. In this regard, it should be appreciated that the services illustrated in FIG. 14 as executing on the server computer 1402F can execute on many other physical or virtual servers in the data centers 1304 in various configurations.

In the example data center 1304 shown in FIG. 14, an appropriate LAN 1406 is also utilized to interconnect the server computers 1402A-1402F. The LAN 1406 is also connected to the network 1402 illustrated in FIG. 14. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 1404A-1404N, between each of the server computers 1402A-1402F in each data center 1304, and, potentially, between computing resources in each of the data centers 1304. It should be appreciated that the configuration of the data center 1304 described with reference to FIG. 14 is merely illustrative and that other implementations can be utilized.

Figure 15:
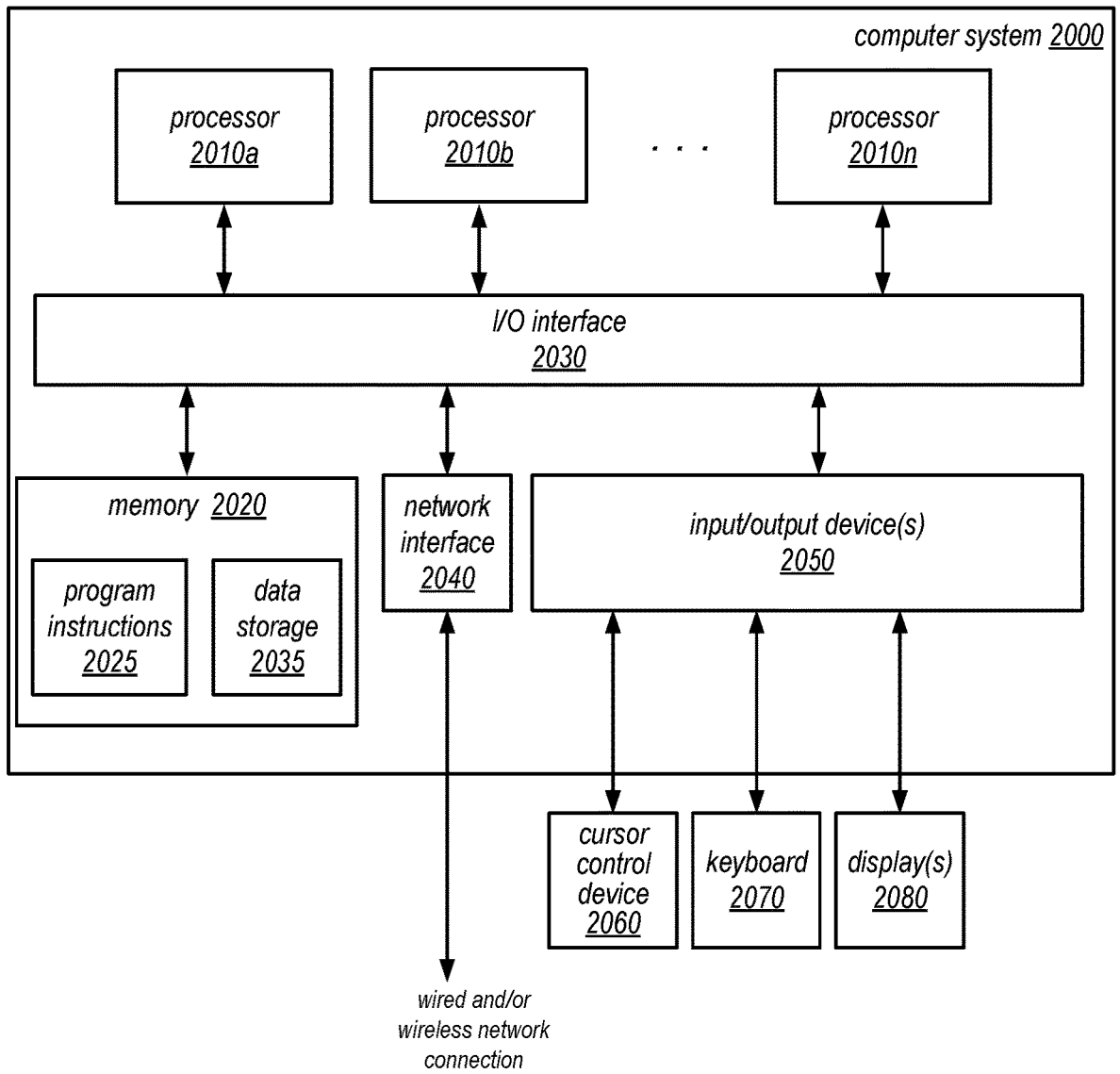
FIG. 15 illustrates an example system configured to implement the various methods, techniques, and systems described herein, according to some embodiments.

Embodiments of a managed query execution as described herein may be executed on one or more computer systems, which may interact with various other devices. One such computer system is illustrated by FIG. 15. In different embodiments, computer system 2000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, computing system compute system, or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Display(s) 2080 may include standard computer monitor(s) and/or other display systems, technologies or devices. In at least some implementations, the input/output devices 2050 may also include a touch- or multi-touch enabled device such as a pad or tablet via which a user enters input via a stylus-type device and/or one or more digits. In some embodiments, it is contemplated that embodiments may be implemented using a single instance of computer system 2000, while in other embodiments multiple such systems, or multiple nodes making up computer system 2000, may host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

In some embodiments, at least one processor 2010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 2020 may store program instructions and/or data accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. Generally speaking, a non-transitory, computer-readable storage medium may include storage media or memory media such as magnetic or optical media, e.g., disk or CD/DVD-ROM coupled to computer system 2000 via I/O interface 2030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 2040.

In one embodiment, I/O interface 2030 may coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor 2010.

Network interface 2040 may allow data to be exchanged between computer system 2000 and other devices attached to a network, such as other computer systems, or between nodes of computer system 2000. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 15, memory 2020 may include program instructions 2025, may implement the various methods and techniques as described herein, and data storage 2035, comprising various data accessible by program instructions 2025. In one embodiment, program instructions 2025 may include software elements of embodiments as described herein and as illustrated in the Figures. Data storage 2035 may include data that may be used in embodiments. In other embodiments, other or different software elements and data may be included.

Those skilled in the art will appreciate that computer system 2000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, leader nodes within a data warehouse system may present data storage services and/or database services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   at least one processor; and
   a memory to store program instructions that when executed by the at least one processor, cause the at least one processor to implement a network-based service, the network-based service configured to:
   track execution status for a plurality of previously received queries executing at a plurality of computing resources obtained from a dedicated pool of computing resources configured to execute queries for one or more users of the network-based service;
   based, at least in part, on the tracked execution status of the plurality of previously received queries, update resource management data for the network-based service to identify one or more of the plurality of computing resources as available for servicing queries for the network-based service instead of returning the one or more of the plurality of computing resources to the dedicated pool of computing resources; and
   select a computing resource from the one or more computing resources identified as available to execute queries in the resource management data to execute a query received from one of the one or more users at the network-based service; and
   use the selected computing resource to execute the query.

2. The system of claim 1, wherein to select the computing resource, the network-based service is configured to identify those computing resources that executed a previously received query received from a same submitter of the query.

3. The system of claim 1, wherein the network-based service is further configured to:
provide a result of the query via an interface of the network-based service.

4. The system of claim 1, wherein the network-based service is a managed query service, wherein data accessed to execute the query is stored in a distributed storage service, and wherein the managed query service and the distributed storage service are implemented as part of a same provider network.

5. A method, comprising:
for one or more computing resources obtained from a dedicated pool of computing resources configured to execute queries for a network-based service for one or more users, detecting completion of one or more previously received queries executing at the one or more computing resources;
updating resource management data for the network-based service, based at least in part on tracked execution status of the one or more previously received queries, to identify the one or more computing resources as available for servicing queries for the network-based service instead of returning the one or more computing resources to the dedicated pool of computing resources; and
selecting a computing resource from the one or more computing resources identified as available to execute queries in the resource management data to execute a query received from one of the one or more users at the network-based service; and
using the selected computing resource to execute the query.

6. The method of claim 5, wherein detecting completion of one or more previously received queries executing at the one or more computing resources comprises polling the computing resource that executed the query.

7. The method of claim 5, wherein the query is a saved query.

8. The method of claim 5, wherein the query is received via a driver interface supported by the network-based service.

9. The method of claim 5, further comprising:
returning another one of the available computing resources with an amount of time elapsed since obtaining the other computing resource from the resource pool exceeding a resource cache threshold.

10. The method of claim 5, wherein selecting the computing resource comprises identifying those computing resources that executed a previously received query received from a same submitter as the query.

11. The method of claim 5, further comprising providing a result of the query via an interface of the network-based service.

12. The method of claim 5, further comprising:
receiving another query at the network-based service; and
based on an evaluation of the resource management data, obtaining another computing resource from the dedicated pool of computing resources to execute the query.

13. The method of claim 5, further comprising providing an indication of the completion of one of the previously received queries to a client that submitted the one previously received query.

14. A non-transitory, computer-readable storage medium, storing program instructions that when executed by one or more computing devices cause the one or more computing devices to implement:
for one or more computing resources obtained from a dedicated pool of computing resources configured to execute queries for a network-based service, detecting completion of one or more previously received queries executing at the one or more computing resources;
updating resource management data for the network-based service, based at least in part on tracked execution status of the one or more previously received queries, to identify the one or more computing resources as available for servicing queries for the network-based service instead of returning the one or more computing resources to the dedicated pool of computing resources;
selecting a computing resource from the one or more computing resources identified as available to execute queries in the resource management data to execute a query received from one of the one or more users at the network-based service; and
using the selected computing resource to execute the query.

15. The non-transitory, computer-readable storage medium of claim 14, wherein, in selecting the computing resource, the program instructions cause the one or more computing devices to implement identifying those computing resources that executed a previously received query received from a same submitter as the query.

16. The non-transitory, computer-readable storage medium of claim 14, wherein, in detecting completion of one or more previously received queries executing at the one or more computing resources, the program instructions cause the one or more computing devices to implement polling the computing resource that executed the query via a message queue.

17. The non-transitory, computer-readable storage medium of claim 14, wherein the query is a saved query.

18. The non-transitory, computer-readable storage medium of claim 14, wherein the query is received via a driver interface supported by the network-based service.

19. The non-transitory, computer-readable storage medium of claim 14, wherein the program instructions cause the one or more computing devices to further implement:
for different computing resource obtained from the pool of computing resources, detecting completion of a previously received query executing at the different computing resource;
determining that including the different computing resource in the available computing resources identified in the resource management data exceeds a resource throttling threshold; and
in response to determining that including the different computing resource in the available computing resources identified in the resource management data exceeds the resource throttling threshold, returning the different computing resource to the dedicated pool of computing resources.

20. The non-transitory, computer-readable storage medium of claim 14, wherein the network-based service is a managed query service, wherein data accessed to execute the query is stored in a distributed storage service, and wherein the managed query service and the distributed storage service are implemented as part of a same provider network.

* * * * *